US009263734B2

(12) United States Patent
Yokomizo et al.

(10) Patent No.: US 9,263,734 B2
(45) Date of Patent: Feb. 16, 2016

(54) MULTILAYER-STRUCTURED CARBON MATERIAL FOR NONAQUEOUS ELECTROLYTIC SOLUTION SECONDARY BATTERY NEGATIVE ELECTRODE, NEGATIVE ELECTRODE FOR NONAQUEOUS SECONDARY BATTERY, LITHIUM ION SECONDARY BATTERY, AND PROCESS FOR PRODUCING MULTILAYER-STRUCTURED CARBON MATERIAL FOR NONAQUEOUS ELECTROLYTIC SOLUTION SECONDARY BATTERY NEGATIVE ELECTRODE

(71) Applicant: MITSUBISHI CHEMICAL CORPORATION, Chiyoda-ku (JP)

(72) Inventors: Masakazu Yokomizo, Ibaraki (JP); Tooru Fuse, Ibaraki (JP); Yosuke Saito, Ibaraki (JP); Masashi Fujiwara, Kagawa (JP); Akihiro Kato, Kagawa (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 197 days.

(21) Appl. No.: 13/872,647

(22) Filed: Apr. 29, 2013

(65) Prior Publication Data

US 2013/0252093 A1    Sep. 26, 2013

Related U.S. Application Data

(63) Continuation of application No. PCT/JP2011/074868, filed on Oct. 27, 2011.

(30) Foreign Application Priority Data

Oct. 29, 2010 (JP) .................. 2010-244346

(51) Int. Cl.
| | |
|---|---|
| *H01M 4/133* | (2010.01) |
| *H01M 4/1393* | (2010.01) |
| *H01M 4/36* | (2006.01) |
| *H01M 10/0525* | (2010.01) |
| *H01M 4/587* | (2010.01) |
| *B02C 19/00* | (2006.01) |
| *H01M 4/62* | (2006.01) |
| *H01M 4/02* | (2006.01) |

(52) U.S. Cl.
CPC ........... *H01M 4/133* (2013.01); *B02C 19/0056* (2013.01); *H01M 4/1393* (2013.01); *H01M 4/366* (2013.01); *H01M 4/587* (2013.01); *H01M 4/625* (2013.01); *H01M 10/0525* (2013.01); *H01M 2004/021* (2013.01); *H01M 2004/027* (2013.01); *Y02E 60/122* (2013.01)

(58) Field of Classification Search
CPC ... H01M 4/133; H01M 4/1393; H01M 4/366; H01M 10/0525; H01M 4/587; H01M 4/625; H01M 2004/027; H01M 2004/021; B02C 19/0056
See application file for complete search history.

(56) References Cited

U.S. PATENT DOCUMENTS

| | | | |
|---|---|---|---|
| 6,403,259 B1 | 6/2002 | Kitagawa et al. | |
| 6,632,569 B1 | 10/2003 | Kameda et al. | |
| 7,829,222 B2 | 11/2010 | Takei et al. | |
| 8,211,571 B2 | 7/2012 | Takei et al. | |
| 2002/0061445 A1 | 5/2002 | Kitagawa et al. | |
| 2004/0115117 A1* | 6/2004 | Takei et al. | .................. 423/448 |
| 2008/0274406 A1 | 11/2008 | Fuse et al. | |
| 2011/0262802 A1 | 10/2011 | Uono et al. | |

FOREIGN PATENT DOCUMENTS

| | | |
|---|---|---|
| CN | 1527795 A | 9/2004 |
| JP | 11-54123 A | 2/1999 |
| JP | 2002-222650 | 8/2002 |
| JP | 2003-12311 | 1/2003 |
| JP | 2003-132889 | 5/2003 |
| JP | 2003-173778 | 6/2003 |
| JP | 3534391 | 3/2004 |
| JP | 2006-49288 | 2/2006 |
| JP | 2007-053022 | 3/2007 |
| JP | 2007-145697 | 6/2007 |
| JP | 2007-317551 | 12/2007 |
| JP | 2009-110972 | 5/2009 |
| JP | 2009-187939 | 8/2009 |
| JP | 2010-135314 | 6/2010 |
| JP | 2010-165580 A | 7/2010 |
| WO | 02/059040 | 8/2002 |

OTHER PUBLICATIONS

International Search Report issued Jan. 31, 2012 in PCT/JP2011/074868 filed Oct. 27, 2011.
Combined Chinese Office Action and Search Report issued Nov. 2, 2014 in Patent Application No. 201180051540.7 (with English Translation).
Japanese Office Action issued Dec. 16, 2014 in Patent Application No. 2011-236216 (with English Translation).
Office Action issued Jun. 26, 2015, in Chinese Patent Application No. 201180051540.7 (with English-language Translation).

* cited by examiner

*Primary Examiner* — Muhammad Siddique
(74) *Attorney, Agent, or Firm* — Oblon, McClelland, Maier & Neustadt, L.L.P.

(57) ABSTRACT

The present invention resolves the problem by using a multilayer-structured carbon material, as a nonaqueous electrolytic solution secondary battery negative electrode, which satisfies the following (a) and (b):

(a) (Void fraction calculated from DBP oil absorption)/ (Void fraction calculated from tapping density) is less than 1.01; and (b) Surface oxygen content (O/C) determined by X-ray photoelectron spectroscopy is 1.5 atomic % or more.

10 Claims, No Drawings

MULTILAYER-STRUCTURED CARBON MATERIAL FOR NONAQUEOUS ELECTROLYTIC SOLUTION SECONDARY BATTERY NEGATIVE ELECTRODE, NEGATIVE ELECTRODE FOR NONAQUEOUS SECONDARY BATTERY, LITHIUM ION SECONDARY BATTERY, AND PROCESS FOR PRODUCING MULTILAYER-STRUCTURED CARBON MATERIAL FOR NONAQUEOUS ELECTROLYTIC SOLUTION SECONDARY BATTERY NEGATIVE ELECTRODE

TECHNICAL FIELD

The present invention relates to a multilayer-structured carbon material for use in a nonaqueous electrolytic solution secondary battery, a negative electrode for a nonaqueous secondary battery, formed using the carbon material, a nonaqueous electrolytic solution secondary battery having the negative electrode, and a process for producing a multilayer-structured carbon material for a nonaqueous electrolytic solution secondary battery negative electrode.

BACKGROUND ART

In recent years, with miniaturization of electronic devices, a demand for high capacity secondary batteries has increased. Particularly, attention has been attracted to a lithium ion secondary battery having a high energy density and excellent large-current charge-discharge behavior as compared with nickel-cadmium batteries or nickel-hydrogen batteries.

It is known to use graphite as a carbon material for the lithium ion secondary battery. Particularly, when graphite having a large graphitization degree is used as a carbon material for the lithium ion secondary battery, a capacity close to 372 mAh/g that is a theoretical capacity for lithium occlusion of graphite is obtained and furthermore, costs and durability are also excellent, so that it is known that the graphite is preferable as an active material.

However, when graphite is only applied to the lithium ion secondary battery, it is difficult to increase the energy density, obtain the large-current charge-discharge behavior, and exhibit durability characteristics represented by cycle characteristics and applicability of a paste simultaneously.

For example, Patent Document 1 discloses that a lithium ion secondary battery using an aqueous binding agent can be also charged fast by subjecting graphite particles to a mechanochemical treatment and thereby hydrophilizing surfaces of the graphite particles.

PRIOR ART DOCUMENT

Patent Document

Patent Document 1: JP-A-2003-132889

SUMMARY OF THE INVENTION

Problems that the Invention is to Solve

According to the investigation of the present inventors, in the technology described in Patent Document 1, an improvement in the fast charging characteristic for the lithium ion secondary battery is obtained but there is a problem that an improvement in not only initial efficiency but also cycle characteristics, which are desired for the lithium ion secondary battery, is not obtained.

Also, in a conventional technology where only tapping density is increased by merely changing spheroidicity or average particle size of a carbon material generally showing a resemble true density in order to improve the cycle characteristics, total friction between particles decreases and thus the problem has not been solved.

The present invention is devised in consideration of such problems and an object thereof is to provide a negative electrode material that solves the problem of a decrease in the cycle characteristics derived from expansion and contraction of a carbon-containing negative electrode by repeated charge and discharge and also is suitable for a lithium ion secondary battery.

More specifically, an object thereof is to provide a carbon material and a negative electrode that can improve trade-off relationships and exhibit good performance in paste properties, initial efficiency, cycle characteristics, low-temperature output, plate strength, and the like, and a lithium ion secondary battery using them.

Means for Solving the Problems

As a result of extensive studies for solving the above problems, the present inventors have found a multilayer-structured carbon material for a nonaqueous electrolytic solution secondary battery negative electrode excellent in performance in paste properties, initial efficiency, cycle characteristics, low-temperature output, slurry characteristics, and the like by treating a multilayer-structured carbon material under specific cracking conditions. Thus, they have accomplished the invention.

Specifically, they have found a technique of cleaving bonds of fine agglomeration slightly remaining in the multilayer-structured carbon material and reacting it with a surrounding atmosphere by imparting energy having a certain power or less to the multilayer-structured carbon material for a certain period of time without imparting an impact force as possible, and thus they have accomplished the invention.

Namely, the invention is as follows.

1. A multilayer-structured carbon material for a nonaqueous electrolytic solution secondary battery negative electrode, which satisfies the following (a) and (b):

(a) (Void fraction calculated from DBP oil absorption)/(Void fraction calculated from tapping density) is less than 1.01; and (b) Surface oxygen content (O/C) determined by X-ray photoelectron spectroscopy is 1.5 atomic % or more.

2. A multilayer-structured carbon material for a nonaqueous electrolytic solution secondary battery negative electrode, which comprises graphite particles and amorphous carbon that coats the surface of the graphite particles, and satisfies the following (a):

(a) (Void fraction calculated from DBP oil absorption)/(Void fraction calculated from tapping density) is less than 1.01.

3. A multilayer-structured carbon material for a nonaqueous electrolytic solution secondary battery negative electrode, which comprises graphite particles and graphite carbon that coats the surface of the graphite particles, and satisfies the following (a) and (b):

(a) (Void fraction calculated from DBP oil absorption)/(Void fraction calculated from tapping density) is less than 1.01; and (b) Surface oxygen content (O/C) determined by X-ray photoelectron spectroscopy is 1.5 atomic % or more.

4. The multilayer-structured carbon material for a nonaqueous electrolytic solution secondary battery negative electrode according to any one of the items 1 to 3 above, wherein the DBP oil absorption is 75 ml/100 g or less and a Raman value R determined from Raman spectrometry is 0.15 or more.

5. The multilayer-structured carbon material for a nonaqueous electrolytic solution secondary battery negative electrode according to any one of the items 1 to 4 above, wherein a ratio of the number of particles of 3 μm or less observed on a flow particle image analyzer is 5% or more.

6. A negative electrode for a nonaqueous electrolytic solution secondary battery, comprising a current collector and an active material layer formed on the current collector, wherein the active material layer contains the multilayer-structured carbon material for a nonaqueous electrolytic solution secondary battery negative electrode according to any one of the items 1 to 5 above.

7. A lithium ion secondary battery, comprising: a positive electrode and a negative electrode capable of occluding and releasing lithium ion; and an electrolyte wherein the negative electrode is the negative electrode for a nonaqueous electrolytic solution secondary battery according to the item 6 above.

8. A process for producing a multilayer-structured carbon material for a nonaqueous electrolytic solution secondary battery negative electrode, which comprises subjecting a multilayer-structured carbon raw material to a cracking treatment, wherein, in the cracking treatment, power per weight of the multilayer-structured carbon raw material is 50 W/kg or more and 3,000 W/kg or less.

9. The process for producing a multilayer-structured carbon material for a nonaqueous electrolytic solution secondary battery negative electrode according to the item 8 above, wherein the cracking treatment is performed under an oxygen atmosphere.

10. The process for producing a multilayer-structured carbon material for a nonaqueous electrolytic solution secondary battery negative electrode according to the item 8 or 9 above, wherein the cracking treatment is performed for a treatment time of 0.1 minutes to 120 minutes.

Advantage of the Invention

The multilayer-structured carbon material of the invention can provide a negative electrode for a nonaqueous electrolytic solution secondary battery, which can improve trade-off relationships and exhibit good performance in paste properties, initial efficiency, cycle characteristics, low-temperature output, and the like, and a nonaqueous electrolytic solution secondary battery using the same. Moreover, according to the process for producing a negative electrode for a nonaqueous electrolytic solution secondary battery of the invention, it becomes possible to produce a negative electrode material having the aforementioned advantages in simple and easy steps.

MODE FOR CARRYING OUT THE INVENTION

The following will describe the content of the present invention in detail. The explanation on constituent features of the invention to be described below is one example (a representative example) of the embodiments of the invention and the invention should not be construed as being specified to these modes unless it exceeds the gist.

<Multilayer-Structured Carbon Material for Nonaqueous Electrolytic Solution Secondary Battery Negative Electrode>

The multilayer-structured carbon material for a nonaqueous electrolytic solution secondary battery negative electrode (sometimes referred to as merely "multilayer-structured carbon material" in the present Description) according to the invention has a multilayer structure and is not particularly limited as far as it satisfies the physical properties and the like of the following requirements.

As the multilayer-structured carbon material in the present Description, there may be, for example, mentioned those obtained by coating graphite particles (nuclear graphite) partly or wholly with carbon (amorphous carbon) or graphite carbon. The following will describe physical properties and constitution of preferable multilayer-structured carbon materials.

Main Physical Properties of Multilayer-Structured Carbon Material (1) (Void Fraction Calculated from DBP Oil Absorption)/(Void Fraction Calculated from Tapping Density)

In the present Description, (Void fraction calculated from DBP oil absorption)/(Void fraction calculated from tapping density) is abbreviated as void ratio in some cases.

The void ratio in the invention relates to voids between particles derived from agglomerated particles, surface oxygen content on the particle surfaces, and the primary particle shape, and is one index for performance exhibition in the invention.

More specifically, the void ratio is a ratio of void volume defined by the DBP oil absorption to void volume defined by the tapping density. In the void fraction defined by the DBP oil absorption, insides of the agglomerated particles are also regarded as voids, and the void fraction is an index in which contact resistance or resistance of contact area per unit contact area of the negative electrode surface derived from functional groups and the like is less prone to be expressed and has an important meaning as an index of paste coating ability.

On the other hand, the tapping density is also influenced by the inner voids of the agglomerated particles. However, since the particles are directly brought into contact and vibrated, the influence of contact resistance per unit contact area or contact area appears more remarkably and thus it is an index that is prone to come under the influence of the presence of fine particles and functional groups, so that it is an index that has a large influence on the cycle characteristics.

Therefore, the ratio thereof (void ratio) becomes an index that remarkably shows the influence of increase in the contact resistance excluding a factor of the particle shape, that is, the influence of increase in the contact area by fine particles or the contact resistance per area derived from functional groups.

More specifically, since the paste coating ability is generally better when the void fraction calculated from the DBP oil absorption is smaller and the cycle characteristics are generally better when the void fraction calculated from the tapping density is larger, the index of the void fraction ratio is suitable for relating them. Usually, the advantages of the invention can be further exhibited when the ratio is smaller.

Accordingly, the void ratio in the invention can be calculated according to the following expression 1.

(Void ratio)=(Void fraction calculated from DBP oil absorption)/(Void fraction calculated from tapping density)  Expression 1

The void ratio is usually less than 1.01, preferably 0.98 or less, more preferably 0.97 or less, and further preferably 0.96 or less. Moreover, usually, it is preferably 0.90 or more, more preferably 0.91 or more, and further preferably 0.92 or more.

By controlling the void fraction ratio to less than 1.01, the fine agglomerated particles in the multilayer-structured carbon material can be reduced to improve packing ability at the time of transformation of the multilayer-structured carbon material into an electrode plate, and coating density can be increased to improve the cycle characteristics. In this regard, when the void ratio is 1.01 or more, the fact shows that a large amount of uncracked agglomerated particles are present, and the advantages of the invention are not exhibited. Moreover, when the void ratio is too small, a huge energy is required for the treatment and there is a concern of environmental burden and costs owing to an energy waste.

When an operation of increasing spheroidicity of the particles is carried out in order to decrease the DBP oil absorption at the preparation of the usual negative electrode active material, there is a tendency of increasing the tapping density and the value of the void ratio does not change. Namely, securing of the contact area for improving the cycle characteristics and the decrease in the DBP oil absorption for securing the paste characteristics become trade-off performances. Accordingly, it becomes a necessary condition for avoiding the trade-off relationship to lower the ratio.

(2) DBP Oil Absorption

When a common coating step is considered, a solvent fraction in a paste to be applied has a limitation based on the limitation of furnace length or temperature in a drying step. The DBP (dibutyl phthalate) oil absorption is an index similar to the volume occupied by an active material in the applied paste. Thus, the larger the index is, the larger the space volume occupied by the active material in the paste is.

In the above limitation, that is, in the case of consideration at a certain solvent fraction, when the DBP oil absorption is large, particles cannot flow smoothly in the paste, so that the viscosity increases or behavior becomes such one like dilatancy, which results in lineation on the coated surface or impossible application. Therefore, with regard to the paste properties, the decrease in the DBP oil absorption is one of important matters.

Accordingly, the DBP oil absorption is usually preferably 75 ml/100 g or less, more preferably 65 ml/100 g or less, further preferably 60 ml/100 g or less, and particularly preferably 57 ml/100 g or less. Moreover, it is usually preferably 30 ml/100 g or more, more preferably 40 ml/100 g or more, and further preferably 45 ml/100 g or more.

Moreover, when the DBP oil absorption is too large, the fact shows the presence of a large amount of uncracked agglomerated particles and the advantages of the invention are not exhibited. When the absorption is too small, there is a possibility that pore structures are hardly present in the particles and there is a tendency that a reaction surface decreases.

Furthermore, the DBP oil absorption in the invention is defined by a value calculated from the amount of dropped oil when 70% torque of the maximum torque is shown in the region from the beginning of measurement until the maximum torque at the time when, in accordance with JIS K6217 (2001), a material to be measured is charged in an amount of 40 g, a dropping rate is set at 4 ml/min, the number of rotations is set at 125 rpm, and the measurement is performed until the maximum value of torque is confirmed. Also, the void fraction calculated from the DBP oil absorption is calculated from the following expression 2.

[Void fraction calculated from DBP oil absorption(%)]=(DBP oil absorption)/{DBP oil absorption+(100/true density)}×100    Formula 2

The true density in the invention is defined by one measured by a liquid-phase substitution method (a pycnometer method) using butanol.

The void fraction calculated from the DBP oil absorption is usually preferably 63% or less, more preferably 59% or less, further preferably 58% or less, and particularly preferably 56% or less. Moreover, it is usually preferably 40% or more, more preferably 47% or more, and further preferably 50% or more. The lower the void fraction calculated from the DBP oil absorption is, the more the space between the particles is filled with DBP and the more the liquid is homogeneously dispersed, so that the slurry characteristics are improved.

When the void fraction calculated from the DBP oil absorption is too large, the fact shows the presence of a large amount of uncracked agglomerated particles in the multilayer-structured carbon raw material and there is a tendency that the advantages of the invention are not exhibited. When the void fraction calculated from the DBP oil absorption is too small, there is a possibility that pore structures are hardly present in the particles and there is a tendency that a reaction surface decreases.

(3) Tapping Density

The tapping density of the multilayer-structured carbon material of the invention is usually preferably 0.50 g/cm$^3$ or more, more preferably 0.75 g/cm$^3$ or more, further preferably 0.85 g/cm$^3$ or more, and particularly preferably 0.90 or more. Moreover, it is usually preferably 1.35 g/cm$^3$ or less, more preferably 1.20 g/cm$^3$ or less, and further preferably 1.10 g/cm$^3$ or less.

When the tapping density is too low, lineation occurs at electrode plate formation and thus problems tend to arise in the process. When the tapping density is too high, carbon density in the particles increases, the material lacks rolling ability, and hence there is a tendency that it becomes difficult to form a negative electrode sheet having a high density.

With regard to the tapping density, for example, using a powder density meter (Powder Tester PT-N manufactured by Hosokawa Micron Corporation), a carbon material is dropped into a cylindrical tap cell having a diameter of 5 cm and a volume of 100 cm$^3$ through a sieve to fill the cell, subsequently a tap with a stroke length of 18 mm is performed 500 times, and density determined from the volume at that time and the weight of the sample can be defined as the tapping density.

[Void fraction calculated from tapping density(%)]= 100−(Tapping density)/(True density)×100    Expression 3

The void fraction calculated from the tapping density is usually preferably 77% or less, more preferably 66% or less, further preferably 62% or less, and particularly preferably 60% or less. Moreover, it is usually preferably 42% or more, more preferably 46% or more, and further preferably 51% or more. The higher the void fraction calculated from the tapping density is, the more the cycle characteristics are improved.

When the void fraction calculated from the tapping density is too large, the fact shows the presence of a large amount of uncracked agglomerated particles and there is a possibility that the advantages of the invention are not exhibited. When the void fraction calculated from the tapping density is too small, there is a possibility that pore structures are hardly present in the particles and there is a tendency that a reaction surface decreases.

(4) Surface Oxygen Content

The surface oxygen content (sometimes abbreviated as O/C) in the invention can be calculated according to the following expression 4.

The O/C value represents surface oxygen content formed depending on the surrounding atmosphere after the cracking treatment in the invention. Since a surface oxygen-containing functional group has an effect of shifting a binding agent-attaching site and is formed on cleaved surfaces of the particles at the cracking treatment, the content becomes an important index of disintegration of the agglomerated particles.

The O/C value is usually 1.5 atomic % or more, preferably 2.0 atomic % or more, more preferably 3.0 atomic % or more, and further preferably 4.0 atomic % or more. An upper limit is preferably 15 atomic % or less, more preferably 10 atomic % or less, and further preferably 7.5 atomic % or less.

By controlling the surface oxygen content O/C value to 1.5 atomic % or more, dispersing ability of the binding agent or a thickener is improved at electrode plate formation and electrode intensity at the electrode using the multilayer-structured carbon material and the carbon material is increased, so that the cycle characteristics and input/output characteristics can be improved.

When the surface oxygen content O/C value is too small, the advantage of the invention cannot be attained. On the other hand, when the value exceeds the above value, the reactivity with the electrolyte increases, so that there is a possibility of inviting a decrease in charge-discharge efficiency or an increase in gas generation.

O/C value(%)=O atomic concentration determined based on peak area of O1s spectrum in X-ray photoelectron spectroscopy(XPS)analysis/C atomic concentration determined based on peak area of C1s spectrum in X-ray photoelectron spectroscopy(XPS)analysis×100　　　Expression 4

The surface oxygen content in the invention can be measured using X-ray photoelectron spectroscopy (XPS).

With regard to the surface oxygen content O/C value, using an X-ray photoelectron spectroscope for the X-ray photoelectron spectroscopy measurement, an object to be measured is placed on a sample table so that the surface becomes flat and spectra at C1s (280 to 300 eV) and O1s (525 to 545 eV) are measured by a multiplex measurement using Kα ray of aluminum as an X-ray source.

Charge correction is performed using the peak top of obtained C1s as 284.3 eV, peak areas of spectra at C1s and O1s are determined, and the peak areas are multiplied by an apparatus sensitivity coefficient to calculate surface atomic concentrations of C and O, respectively. A value of {Obtained atomic concentration ratio of O to C O/C(O atomic concentration/C atomic concentration)}×100 is defined as a surface oxygen content O/C value of the carbon material.

(5) Raman R Value

With regard to the Raman R value of the multilayer-structured carbon material, intensity $I_A$ of a peak $P_A$ at around 1580 $cm^{-1}$ and intensity $I_B$ of a peak $P_B$ at around 1360 $cm^{-1}$ are measured and an intensity ratio $R(R=I_B/I_A)$ thereof is calculated and defined.

The Raman R value is preferably 0.15 or more, more preferably 0.20 or more, further preferably 0.25 or more, and particularly preferably 0.30 or more. Moreover, usually, it is preferably 1.0 or less, more preferably 0.8 or less, and further preferably 0.7 or less.

When the Raman R value is too small, the fact indicates that cleaved surface formed by cracking is little, so that the cracking treatment does not sufficiently proceed and there is a possibility that the advantages of the invention are not exhibited. On the other hand, when the Raman R value is too large, the crystals on the particle surface are disturbed and the reactivity with the electrolytic solution increases, so that there is a tendency of inviting a decrease in charge-discharge efficiency or an increase in gas generation.

The Raman spectra can be measured on a Raman spectroscope. Specifically, a sample is packed by gravity dropping of target particles to be measured into a measuring cell and measurement is performed under irradiation of the measuring cell with an argon ion laser light with rotating the measuring cell in a plane perpendicular to the laser light.

Wavelength of argon ion laser light: 514.5 nm

Laser power on sample: 25 mW, Resolution: 4 $cm^{-1}$, Measurement range: 1100 $cm^{-1}$ to 1730 $cm^{-1}$, Peak intensity measurement, peak half-value width measurement: background treatment, smoothing treatment (convolution by simple average 5 points)

(6) Ratio of Number of Particles of 3 μm or Less

For measuring the ratio of number of particles of 3 μm or less in the multilayer-structured carbon material, using a flow type particle image analyzer (for example, FPIA manufactured by Sysmex Industrial Corporation), about 0.2 g of a sample is dispersed in a 0.2% by mass aqueous solution (about 50 mL) of polyoxyethylene(20)sorbitan monolaurate that is a surfactant, the dispersion is irradiated with an ultrasonic wave of 28 kHz at an output of 60 W for 1 minute, subsequently a detection range is designated to be 0.6 to 400 and a ratio of the number of particles of 3 μm or less among the number of all the particles is calculated.

The ratio of particles of 3 μM or less is usually preferably 5% or more, more preferably 7% or more, and further preferably 10% or more. The upper limit is preferably 40% or less, more preferably 30% or less, and further preferably 20% or less.

When the ratio of particles of 3 μm or less is too small, the presence of fine particles that increase the contact area by cracking is insufficient and there is a possibility that the cycle characteristics cannot be expressed. On the other hand, when the value is too large, there is a possibility of over pulverization and there is a possibility of inviting a decrease in initial efficiency through excess reaction with the electrolytic solution.

(7) Circularity

Using a flow type particle image analyzer (for example, FPIA manufactured by Sysmex Industrial Corporation), about 0.2 g of a sample is dispersed in a 0.2% by mass aqueous solution (about 50 mL) of polyoxyethylene(20)sorbitan monolaurate that is a surfactant, the dispersion is irradiated with an ultrasonic wave of 28 kHz at an output of 60 W for 1 minute, subsequently a detection range is designated to be 0.6 to 400 μm, and a value obtained by measuring particles having a particle size of 1.5 to 40 μm is used as the circularity.

A method of improving the circularity is not particularly limited but a spherical one obtained by performing a spheroidizing treatment is preferred because the shapes of voids among particles when transformed into an electrode body are regulated. Examples of the spheroidizing treatment include a method of mechanically making the shape close to spherical one by imparting shear force or compressive force, a method of mechanical or physical treatment in which plurality of fine particles are granulated with a binder or by adhesion force possessed by the particles themselves, and the other method.

The circularity is usually preferably 0.80 or more, more preferably 0.85 or more, and further preferably 0.88 or more. Moreover, it is usually preferably 1 or less, more preferably 0.98 or less, and further preferably 0.95 or less.

When the circularity is too small, a high current density charge-discharge characteristic tends to decrease. On the other hand, the circularity is too high, since the material has a real spherical shape, there is a possibility that the contact area decreases and the cycle characteristics become worse.

Incidentally, the circularity is defined by the following expression and a theoretically real sphere is attained when the circularity is 1. The circularity can be calculated as (Length of circumference of corresponding circle having the same area as that of projected shape of particle)/(Length of real circumference of projected shape of particle)

(8) BET Specific Surface Area

The specific surface area (SA) of the multilayer-structured carbon material measured using a BET method is usually preferably 0.1 $m^2/g$ or more, more preferably 0.7 $m^2/g$ or more, further preferably 1 $m^2/g$ or more, and particularly preferably 2.0 $m^2/g$ or more. Moreover, it is usually preferably 100 $m^2/g$ or less, more preferably 25 $m^2/g$ or less, further preferably 15 $m^2/g$ or less, and particularly preferably 10 $m^2/g$ or less.

When the value of the specific surface area is too low, the reaction area in the case of the use as a negative electrode material particularly decreases and much time is required for full charge, so that it tends to be difficult to obtain a preferable battery. On the other hand, when the value of the specific surface area is too high, reactivity with the electrolytic solution increases in the case of the use as a negative electrode material and much gas is prone to be generated, so that it tends to be difficult to obtain a preferable battery.

The specific surface area is measured in a BET 6 point manner by a nitrogen gas adsorption flow method using a specific surface area measuring apparatus "Gemini 2360" manufactured by Shimadzu Corporation. Specifically, after 1.01 g of a sample is packed into a cell and is heated to 350° C. to perform a pre-treatment, it is cooled to liquid nitrogen temperature and a gas composed of 30% of nitrogen and 70% of helium is adsorbed to saturation. Subsequently, the sample is heated to room temperature and the amount of the gas desorbed is measured. The specific surface area can be calculated from the obtained result by a usual BET method.

(9) Volume-Based Average Particle Size (Average Particle Size d50)

The volume-based average particle size (sometimes also referred to as average particle size in the Description) of the multilayer-structured carbon material is usually preferably 40 µm or less, more preferably 30 µm or less, further preferably 25 µm or less, particularly preferably 20 µm or less, and most preferably 15 µm or less. Moreover, it is usually preferably 1 µm or more, more preferably 3 µm or more, further preferably 5 µm or more, and particularly preferably 8 µm or more.

When the volume-based average particle size is too large, there is a tendency that a high input-output characteristic is inhibited. When it is too small, an increase in irreversible volume or an increase in the DBP oil absorption is invited and there is a tendency that problems such as lineation are prone to arise at the electrode formation having a coating step.

Moreover, with regard to the volume-based average particle size in the invention, 0.01 g of the carbon material is suspended in 10 mL of a 0.2% by mass aqueous solution of polyoxyethylenesorbitan monolaurate [Tween 20 (registered trademark) as an example] that is a surfactant, the resulting suspension is introduced into a laser diffraction/scattering particle size distribution measuring apparatus "LA-920 manufactured by HORIBA" and is irradiated with an ultrasonic wave of 28 kHz at an output of 60 W for 1 minute, and one measured as a median diameter based on volume in the measuring apparatus is defined as d50 in the invention.

(10) X-Ray Parameter

With regard to the multilayer-structured carbon material, the d value (interlayer distance) of a lattice plane (002 plane) determined by Gakushin method is usually preferably 0.340 nm or less and more preferably 0.337 or less. The fact that the d002 value is too large indicates low crystallinity and there is a case where initial irreversible capacity increases.

On the other hand, since a theoretical value of the plane interval of the 002 plane of graphite is 0.335 nm, 0.335 nm or more is usually preferred. Moreover, the crystallite size (Lc) of the carbon material determined by X-ray diffraction by Gakushin method is usually preferably 1.5 nm or more and more preferably 3.0 nm or more. When the size is less than the range, the particles become particles having low crystallinity and there is a possibility that reversible capacity decreases. The lower limit is the theoretical value of graphite.

(11) Ash Content

Ash content contained in the multilayer-structured carbon material is preferably 1% by mass or less, more preferably 0.5% by mass or less, and particularly preferably 0.1% by mass or less based on the total mass of the multilayer-structured carbon material, and the lower limit is preferably 1 ppm or more.

When the ash content is more than the above range, there is a case where deterioration of battery performance by the reaction with the electrolytic solution at the time of charge and discharge cannot be neglected. When the content is less than the range, much time and energy and a facility for pollution prevention are required for production and thus costs increase in some cases.

(12) Pore Distribution

As the multilayer-structured carbon material, the amount of voids in particles corresponding to a size having a diameter of 0.01 µm or more and 1 µm or less, unevenness owing to steps on the particle surface, which are determined by mercury porosimetry (mercury press-in method) is usually preferably 0.01 mL/g or more, more preferably 0.05 mL/g or more, and further preferably 0.1 mL/g or more. Moreover, it is usually 0.6 mL/g or less, more preferably 0.4 mL/g or less, and further preferably 0.3 mL/g or less.

When the amount of the unevenness is too large, there is a case where a large amount of the binding agent is necessary at electrode plate formation. When the amount of the unevenness is too small, the high current density charge-discharge characteristic decreases and there is a tendency that a relaxation effect on expansion and contraction of electrodes at charge and discharge is not obtained.

Moreover, the total pore volume is usually preferably 0.1 mL/g, more preferably 0.2 mL/g or more, and further preferably 0.25 mL/g or more. Moreover, it is usually preferably 10 mL/g or less, more preferably 5 mL/g or less, and further preferably 2 mL/g or less. When the total pore volume is too large, there is a tendency that a large amount of the binding agent is necessary at electrode plate formation. When the total pore volume is too small, there is a tendency that a dispersing effect of the thickener or the binding agent is not obtained at electrode plate formation.

Moreover, the average pore size is usually preferably 0.03 µm or more, more preferably 0.05 µm or more, further preferably 0.1 µm or more, and particularly preferably 0.5 µm or more. Moreover, it is usually preferably 80 µm or less, more preferably 50 µm or less, and further preferably 20 µm or less. When the average pore size is too large, there is a tendency that a large amount of the binding agent is necessary. When the average pore size is too small, the high current density charge-discharge characteristic tends to decrease.

As an apparatus for mercury porosimetry, a mercury porosimeter (Autopore 9520: manufactured by Micromeritics Corporation) was used. A sample (negative electrode material) is weighed so as to be a value of about 0.2 g, sealed in a cell for powder, and degassed at room temperature under vacuum (50 μmHg or lower) for 10 minutes, thereby carrying out a pre-treatment.

In succession, the pressure is reduced to 4 psia (about 28 kPa) and mercury is introduced. After the pressure is elevated stepwise from 4 psia (about 28 kPa) to 40,000 psia (about 280 MPa), the pressure is lowered to 25 psia (about 170 kPa). The number of steps at pressure elevation is 80 points or more and, at each step, a mercury press-in amount is measured after an equilibrium time of 10 seconds.

From the thus obtained mercury press-in curve, pore distribution is calculated using Washburn's equation. Incidentally, the calculation was performed with regarding surface tension (γ) of mercury as 485 dyne/cm and contact angle (4) as 140°. As the average pore size, a pore size at the time when accumulated pore volume reaches 50% is employed.

(13) True Density

The true density of the multilayer-structured carbon material is usually 1.9 g/cm$^3$ or more, more preferably 2 g/cm$^3$ or more, further preferably 2.1 g/cm$^3$ or more, and particularly preferably 2.2 g/cm$^3$ or more and the upper limit is preferably 2.26 g/cm$^3$ or less. The upper limit is a theoretical value of graphite. When the density is less than the range, the crystallinity of carbon is to low and there is a case where initial irreversible capacity increases.

(14) Aspect Ratio

The aspect ratio of the multilayer-structured carbon material in a powder state is theoretically 1 or more, preferably 1.1 or more, and more preferably 1.2 or more. Moreover, it is usually preferably 10 or less, more preferably 8 or less, and further preferably 5 or less. When the aspect ratio is too large, lineation occurs and a uniform coated surface is not obtained at electrode plate formation, so that the high current density charge-discharge characteristic tends to decrease.

When a diameter that is the longest one of the carbon material particles when they are observed three-dimensionally is regarded as A and a diameter that is orthogonal to the above diameter and is the shortest one is regarded as B, the aspect ratio is represented by A/B. The observation of the carbon particles is performed on a scanning electron microscope capable of magnified observation.

Any 50 pieces of the multilayer-structured carbonaceous particles fixed on an edge surface of a metal having a thickness of 50 μm or less are selected, A and B are measured on each particle with rotating and tilting a stage to which the sample is fixed, and an average value of A/B is determined.

Process for Producing Multilayer-Structured Carbon Material

<Process for Producing Multilayer-Structured Carbon Material for Nonaqueous Electrolytic Solution Secondary Battery Negative Electrode>

The process for producing the multilayer-structured carbon material for a nonaqueous electrolytic solution secondary battery negative electrode is not particularly limited. Incidentally, in the section of <Process for producing multilayer-structured carbon material for nonaqueous electrolytic solution secondary battery negative electrode>, a raw material before performing the cracking treatment and one subjected to the cracking treatment are appropriately distinguished and called a multilayer-structured carbon raw material and a multilayer-structured carbon material, respectively.

The following will specifically describe a process for producing the multilayer-structured carbon material for a nonaqueous electrolytic solution secondary battery negative electrode and a process for producing the multilayer-structured carbon raw material.

The process for producing the multilayer-structured carbon raw material is preferably based on, for example, the production process described in Japanese Patent No. 3534391 or the like.

As the graphite particles to be a raw material as nuclear graphite of the multilayer-structured carbon raw material, for example, more preferred are spheroidized graphite particles produced by imparting a mechanical energy processing to naturally produced scale, flaky, plate-like, and block graphite or artificial graphite produced by heating petroleum cokes, coal pitch cokes, coal needle cokes, meso-phase pitch, or the like to 2,500° C. or higher with adding a graphitization catalyst such as SiC, iron, or boron as required.

In this regard, the mechanical energy processing means that, using an apparatus where a rotor having a large number of blades provided thereon is present in a casing, a mechanical action such as impact compression, friction, or shear force is imparted repeatedly to the aforementioned natural graphite or artificial graphite introduced thereinto by rotating the rotor at a high speed.

The spheroidized graphite particles to be a raw material can be produced by imparting the mechanical energy processing. Specifically, by imparting the mechanical energy processing, flat graphite particles are spheroidized while they are folded, wound up, and chamfered and simultaneously fine cracks, fractures, or structural defects are formed on the particle surface, whereby spherical graphite particles can be produced.

By coating the graphite particles (nuclear graphite) produced as mentioned above with carbon (also referred to as amorphous carbon) or graphite carbon, the multilayer-structured carbon raw material can be produced. Preferably, the multilayer-structured carbon raw material in which the nuclear graphite is coated with carbon (amorphous carbon) is preferred since a synergetic improving effect of the cycle characteristics is obtained, which is considered to be attributable to an improvement in paste characteristics and generation of fine particles.

Specifically, examples of the carbon (amorphous carbon) or graphite carbon with which the graphite particles are coated include petroleum or coal-based tar or pitch, polyvinyl alcohol, and resins such as polyacrylonitrile, phenol resins, and cellulose.

In the case where the graphite particles are combined (coated) with amorphous carbon, it is possible to adopt a method of subjecting a mixture of a carbon precursor and a graphite particle powder to a heating treatment to obtain a composite powder using the carbon precursor for obtaining amorphous carbon as it is, a method of composite formation in which an amorphous carbon powder obtained by partly carbonizing the aforementioned carbon precursor is prepared beforehand and is mixed with the graphite particle powder, and the resulting mixture is subjected to a heating treatment, a method of composite formation in which the aforementioned amorphous carbon powder is prepared beforehand and a graphite particle powder, the amorphous carbon powder, and the carbon precursor are mixed, and the resulting mixture is subjected to a heating treatment, and the other method. In this regard, in the latter two methods in which the amorphous carbon powder is prepared beforehand, it is preferred to use amorphous carbon having an average particle size that is one tenth or less of the average particle size of the graphite particles.

Moreover, it is possible to adopt a method of forming a structure in which one material is entangled in the other material or an electrostatically attached structure by imparting mechanical energy such as pulverization to the amorphous carbon prepared beforehand and graphite particles.

It is preferred to obtain the multilayer-structured carbon raw material in which amorphous carbon or graphite carbon is finally combined with graphite particles by obtaining a mixture of the graphite particles and the carbon precursor or obtaining an intermediate substance by heating a mixture of the graphite particles and the amorphous carbon and the carbon precursor, followed by baking for carbonization and pulverization.

More specific production process for obtaining the multilayer-structured carbon material in the invention can be divided into the following four steps.

First step: graphite particles, a carbon precursor for amorphous carbon, and, if necessary, a solvent are mixed using various commercial mixing machines or kneading machines to obtain a mixture.

Second step: the mixture is heated and the solvent and volatile matter generated from the carbon precursor are removed to obtain an intermediate substance. On this occasion, the operation may be conducted while stirring the mixture as required. Moreover, even when the volatile matter remains, it is removed in the third step to be followed later, so that there arises no problem.

Third step: the above mixture or intermediate substance is heated in a gas atmosphere such as nitrogen gas, carbon dioxide gas, argon gas, or an atmosphere of a gas generated from the mixture or intermediate at a temperature of 400° C. or higher and 3,200° C. or lower to obtain a multilayer-structured carbon raw material.

On this occasion, in the case where the baking temperature is 2,300° C. or higher, a graphite carbon composite carbon raw material is formed but an amorphous carbon composite carbon raw material is formed upon baking at a temperature lower than the temperature.

Fourth step: the above multilayer-structured carbon raw material is subjected to powder processing such as cracking and, if necessary, pulverization and classification. In the invention, by subjecting the multilayer-structured carbon raw material to a specific cracking treatment as shown below, the advantages of the invention can be more efficiently exhibited.

Of these steps, the second step can be omitted depending on cases. Moreover, the fourth step may be carried out before the third step. In that case, if necessary, after the third step, it is also possible to carry out the pulverization/classification treatment and the cracking treatment again to obtain the multilayer-structured carbon material.

The apparatus to be used for the thermal treatment of the raw material in the third step is not particularly limited but examples thereof include a shuttle furnace, a tunnel furnace, a lead hammer furnace, a reaction vessel such as a rotary kiln or an autoclave, a coker (thermal treatment vessel for coke production), a Tammann furnace, or an Acheson furnace. Moreover, examples of the heating method include a high frequency induction heating furnace, direct resistance heating, indirect resistance heating, direct fired heating, radiation heating, and the like. At the treatment, stirring may be performed as required.

As the conditions for the heating treatment in the third step, the lower limit temperature slightly varies depending on the type of the carbon precursor and its thermal history, but it is usually preferably 700° C. or higher, more preferably 800° C. or higher, and further preferably 900° C. or higher in the case of an amorphous carbon composite carbon raw material. On the other hand, the upper limit temperature can be basically raised to a temperature at which the structural order exceeding the crystal structure of the graphite particle nucleus is not present.

Therefore, the upper limit temperature of the heat treatment is preferably lower than 2,300° C., more preferably 2,000° C. or lower, further preferably 1,500° C. or lower, particularly preferably 1,350° C. or lower, and most preferably 1,200° C. or lower.

In the case of a graphite carbon composite carbon raw material, the temperature is preferably 2,300° C. or higher, more preferably 2,500° C. or higher, further preferably 2,700° C. or higher, and particularly preferably 2,800° C. or higher. On the other hand, as the upper limit temperature, there is no problem as far as the temperature falls within the range where the sublimation of carbon does not become a problem. The upper limit temperature for the heat treatment is preferably 3,200° C. or lower and more preferably 3,100° C. or lower.

Also, it is possible to elevate the temperature to a predetermined temperature after performing a heat treatment in a relatively low temperature region. The reaction machine used in the step may be of either batch type or continuous type, and either one or plural units may be used.

The farnece capable of using in the third step is not particularly limited as far as it satisfies the above requirement but the following devices are preferably mentioned.

The apparatus to be used for pulverization in the fourth step is not particularly limited but, as a coarse pulverizer, for example, a shear mil, a jaw crusher, an impact crusher, a cone crusher, and the like may be mentioned. As a medium pulverizer, for example, a roll crusher, a hammer mill, and the like may be mentioned. As fine pulverizer, for example, a vibrating mill, a pin mill, a mixing mill, a jet mill, and the like may be mentioned.

The apparatus to be used for the classification treatment is not particularly limited but, in the case of dry sieving, for example, a rotation sieve, a moving sieve, a rotary moving sieve, a bibration sieve, and the like may be mentioned. In the case of dry air-jet classification, for example, a gravitational classifier, an inertial classifier, a centrifugal classifier (e.g., a classifier, a cyclone, or the like), and the like may be mentioned. Moreover, for example, a wet sieving, a mechanical wet classifier, a hydraulic classifier, a settling classifier, a centrifugal wet classifier, or the like can be used.

Cracking Treatment

With regard to the cracking treatment, representative methods are mentioned below but the multilayer-structured carbon material of the invention should not be construed as being limited to those obtained by the cracking treatment described in the present Description.

The cracking treatment is a treating method of smoothing the surface of the multilayer-structured carbon material with scraping to impart a shear (abrasion) force. In the production process of the invention, it is possible to cleave bonds of slightly remaining fine agglomerated particles in the multilayer-structured carbon raw material by the cracking treatment to impart an oxygen-containing functional group on the surface of the multilayer-structured carbon raw material.

As the cracking treatment, more specifically, so as not to invite an increase in irreversible capacity caused by an increase in the specific surface area through collapse of the multilayer-structured carbon raw material, preferred is a method wherein an oxygen-containing substance is present in the periphery of the multilayer-structured carbon raw material as far as possible at the treatment and energy having a certain power is imparted for a certain period of time without imparting an impulsive force as far as possible. Incidentally, this usually refers to the treatment performed after the fine pulverization treatment in a turbo mill, a pin mill, or the like but these treatments can be also omitted.

Specifically, the power per weight to the multilayer-structured carbon raw material is 50 W/kg or more, preferably 100 W/kg or more, more preferably 200 W/kg or more, and further preferably 400 W/kg or more and is 3,000 W/kg or less, preferably 2,000 W/kg or less, and further preferably 1,000 W/kg or less.

By controlling the power per weight of the multilayer-structured carbon raw material to 50 W/kg or more and 3,000 W/kg or less, it is possible to increase the amount of the oxygen-containing functional groups on the surface of the multilayer-structured carbon raw material to reduce remaining fine agglomerated particles in the multilayer-structured carbon material. Thereby, also in the case of decreasing the amount of the binder, the plate strength can be increased to improve the input-output characteristics and also uniform application on the electrode becomes possible, so that the cycle characteristics can be improved.

When the power is too large, not only cracking of the agglomerated particles but also pulverization of the multilayer-structured carbon raw material occurs, so that there is a tendency that a decrease in the initial efficiency owing to the increase in specific surface area and a decrease in the cycle characteristics occur. Moreover, when the power is too small, the cracking treatment is not sufficiently performed and the particles of the multilayer-structured carbon raw material only come into contact with each other, so that there is a tendency that an effect of improving the cycle characteristics is difficult to obtain.

Incidentally, in the calculation of the power of the multilayer-structured carbon raw material, a difference of the power (W) at the time when idling is performed without charging the multilayer-structured carbon raw material from the power (W) at the treatment operation is determined and a value obtained by dividing the difference by the weight (kg) of the treated material is calculated as a power (W/kg) imparted to the cracking treatment.

The time for imparting the power is usually preferably 0.5 minutes or more, more preferably 1 minute or more, further preferably 3 minutes or more, particularly preferably 5 minutes or more, and most preferably 10 minutes or more and is usually preferably 120 minutes or less, more preferably 60 minutes or less, and further preferably 50 minutes or less.

When the treating time is too long, excessive energy is consumed and there is a tendency that environmental burden and loss in costs are generated. When the treating time is too short, the cracking treatment is not sufficiently performed and the particles of the multilayer-structured carbon material only come into contact with each other, so that there is a tendency that an effect of improving the cycle characteristics is difficult to obtain.

Moreover, when a value obtained by multiplying the power by the treating time and converting the unit system into J/g is taken as energy to be imparted to 1 g of the multilayer-structured carbon raw material, the energy is usually preferably 50 J/g or more, more preferably 100 J/g or more, and further preferably 200 J/g or more. The upper limit is preferably 40,000 J/g or less, more preferably 10,000 J/g or less, further preferably 5,000 J/g or less, particularly preferably 3,000 J/g or less, and most preferably 1,500 J/g or less.

When the energy to be imparted to the multilayer-structured carbon raw material is too small, the cracking treatment is not sufficiently performed and there is a tendency that an effect of improving the cycle characteristics is difficult to obtain. When the energy is too large, excessive energy is consumed and there is a tendency that environmental burden and loss in costs are generated.

With regard to the structure of the apparatus to be used, at least an apparatus in which the multilayer-structured carbon raw material is sandwiched or rubbed between the pulverizing media themselves and an outer wall of the apparatus can be employed in the invention.

Usually, it is preferred to use an apparatus that imparts a large compression and milling action with a small shear action or impact action. Specifically, examples thereof include an apparatus that combines a mortar and a pulverizing medium, a vibrating ball mill, a mechanofusion (manufactured by Hosokawa Micron Corporation), a hybridization system (manufactured by Nara Machinery Co., Ltd.), a ball mill, a faculty (manufactured by Hosokawa Micron Corporation), COMPOSI (manufactured by Nippon Coke & Engineering Co., Ltd.), and the like.

Of these, preferred is an apparatus which has a rod-like metal portion fixed to an inside of the apparatus, of which inside has a cylindrical shape, and moves relatively to the portion with maintaining a certain clearance, the multilayer-structured carbon raw material being sandwiched or rubbed by the movement.

For the reason of using such an apparatus, use can be preferably made an apparatus that imparts small shear action and impact action but large compression action and milling action and realizes a relatively long residential time of particles.

Depending on the apparatus to be used, there is a case where aforementioned clearance is set. At that time, the clearance is usually preferably 1 mm or more, more preferably 2 mm or more, further preferably 3 mm or more, and particularly preferably 5 mm. Also, it is usually preferably 20 mm or less, more preferably 15 mm or less, and further preferably 10 mm or less.

When the numerical value of the clearance is too small, the number of the particles that receive the energy decreases and the effect of milling on the particles tends to decrease. When the numerical value is too large, the distance between the inner piece and the rotor is large, so that shear is difficult to impart and the effect of milling tends to decrease.

Moreover, the peripheral velocity is usually preferably 100 m/s or more, more preferably 500 m/s or more, and further preferably 1,000 m/s or more and is usually preferably 3,000 m/s or less and more preferably 2,000 m/s or less.

When the peripheral velocity is too small, an action of milling attributable to rubbing with the pulverization media themselves and the outer wall of the apparatus tends to decrease. When the peripheral velocity is too large, the impulsive force of the apparatus becomes strong and there is a tendency that not cracking but pulverizing occurs.

Also from the characteristic feature of the treatment, the functional group(s) are not generated from the inside of the multilayer-structured carbon raw material but the situation of the carbonaceous matter on the surface of the multilayer-structured carbon raw material and the liquid and gas in the periphery of the multilayer-structured carbon raw material becomes an important factor.

The peripheral environment of the multilayer-structured carbon raw material at the treatment is not particularly designated as far as the functional group(s) can be imparted to the surface at cracking of the multilayer-structured carbon raw material but an oxygen atmosphere is preferred and specifically, a liquid or gas containing an oxygen atom is more preferred.

The concentration of oxygen is usually preferably 0.1 mol % or more, more preferably 1 mol % or more, further preferably 5 mol % or more, and particularly preferably 20 mol % or more and the upper limit is preferably 80 mol % or less, more preferably 50 mol % or less, and further preferably 40 mol % or less.

When the oxygen partial pressure to be applied is too small, the functional group(s) are insufficiently imparted and there is a tendency that the effect of improving the cycle characteristics is difficult to obtain. When the pressure is too large, there is a risk of explosion and there is a tendency that problems on safe operation are generated.

Other than the above, a monohydric alcohol represented by methanol, ethanol, or isopropyl alcohol, a polyhydric alcohol represented by ethylene glycol or propylene glycol, or an ether or ester compound can be also preferably used. Among gases, ozone, carbon monoxide, $SO_x$, $NO_x$, or the like can be also used.

For example, by performing the specific cracking treatment as mentioned above on the multilayer-structured carbon raw material, the multilayer-structured carbon material for a nonaqueous electrolytic solution secondary battery negative electrode which satisfies the following (a) and (b) can be produced.

(a) (Void fraction calculated from DBP oil absorption)/(Void fraction calculated from tapping density) is less than 1.01;

(b) Surface oxygen content (O/C) determined by X-ray photoelectron spectroscopy is 1.5 atomic % or more.

<Secondary Material>

In the multilayer-structured carbon material in the lithium ion secondary battery of the invention, besides the above multilayer-structured carbon material, by incorporating one or more carbonaceous substances (carbonaceous materials) different in physical properties of carbonaceous matter from the carbon material, it is possible to achieve a further improvement in battery performance.

The "physical properties of carbonaceous matter" mentioned here means one or more properties among an X-ray diffraction parameter, a median diameter, an aspect ratio, a BET specific surface area, an orientation ratio, a Raman R value, tapping density, true density, pore distribution, circularity, and an ash amount.

Moreover, as preferred embodiments, there may be mentioned an embodiment wherein volume-based particle size distribution is not bilaterally symmetrical when the median diameter is taken as a center, an embodiment wherein the multilayer-structured carbon material contains two or more carbon materials different in the Raman R value, and an embodiment wherein X-ray parameters are different from each other.

As one example of effects thereof, there may be mentioned reduction of electric resistance by incorporating a carbon material such as graphite of natural graphite, artificial graphite, or the like, carbon black of acetylene black or the like, or an amorphous carbon of needle cokes or the like as a secondary material, and the like. They may be used singly or two or more thereof may be used in any combination and ratio.

In the case of adding them as a secondary material, the content in the multilayer-structured carbon material is usually preferably 0.1% by mass or more, more preferably 0.5% by mass or more, and further preferably 0.6% by mass or more and is usually preferably 80% by mass or less, more preferably 50% by mass or less, further preferably 40% by mass or less, and particularly preferably 30% by mass or less. When the content is exceedingly less than the range, there is a tendency that an effect of improving conductivity is difficult to obtain. When the content is exceedingly more than the range, an increase in the initial irreversible capacity is invited and thus the case is not preferred.

<Negative Electrode for Nonaqueous Electrolytic Solution Secondary Battery>

The negative electrode for a nonaqueous electrolytic solution secondary battery of the invention (hereinafter appropriately also referred to as "electrode sheet") comprises a current collector and an active material layer containing the multilayer-structured carbon material, which is formed on the current collector, and also preferably contains a binding agent composition. Moreover, if necessary, a thickener can be preferably used.

As the current collector to be coated with a slurry, hitherto known ones can be used. Specifically, there may be mentioned metal thin films such as rolled copper foil, electrolytic copper foil, and stainless steel foil. The thickness of the current collector is usually preferably 4 μm or more and more preferably 6 μm or more and is usually preferably 30 μm or less and more preferably 20 μm or less.

After a slurry is applied on the current collector, it is dried at a temperature of usually preferably 60° C. or higher, more preferably 80° C. or higher and usually preferably 200° C. or lower, preferably 195° C. or lower under a dry air or an inert atmosphere to form an active material layer.

The thickness of the active material layer obtained by applying and drying the slurry is usually preferably 5 μm or more, more preferably 20 μm or more, and further preferably 30 μm or more and is usually preferably 200 μm or less, more preferably 100 μm or less, and further preferably 75 μm or less. When the active material layer is too thin, it lacks practicability as a negative electrode in view of the balance with the particle size of the active material. When the layer is too thick, a sufficient function of occlusion/release of Li toward a high-density electric current value is difficult to obtain.

The density of the multilayer-structured carbon material in the active material layer varies depending on its use but, in the use where the input/output characteristics are though to be important, for example, automobile uses and power tool uses, the density is usually preferably 1.10 g/cm$^3$ or more, more preferably 1.20 g/cm$^3$ or more, and further preferably 1.25 g/cm$^3$ or more and is usually preferably 1.55 g/cm$^3$ or less, more preferably 1.50 g/cm$^3$ or less, and further preferably 1.45 g/cm$^3$ or less.

When the density is too low, contact resistance between particles tends to increase. When the density is too high, a rate characteristic tends to decrease. In the uses where capacity is thought to be important, for example, uses for portable equipment such as portable telephones and personal computers, the density is usually preferably 1.45 g/cm$^3$ or more, more preferably 1.55 g/cm$^3$ or more, further preferably 1.65 g/cm$^3$ or more, and particularly preferably 1.70 g/cm$^3$ or more and is preferably 1.9 g/cm$^3$ or less. When the density is too low, the capacity of the battery per unit volume is not always sufficient. When the density is too high, the rate characteristic tends to decrease.

The following will exemplify details of members relating to the nonaqueous electrolytic solution secondary battery using the carbon material of the invention but usable materials, processes for preparation, and the like should not be construed as being limited to the following specific examples.

<Nonaqueous Electrolytic Solution Secondary Battery>

The basic constitution of the nonaqueous electrolytic solution secondary battery of the invention, particularly the lithium ion secondary battery thereof is similar to the hitherto known lithium ion secondary battery and a positive electrode capable of occluding and releasing lithium ions, an electrolyte, and the like are usually provided as members other than the negative electrode to which the carbon material for a nonaqueous electrolytic solution secondary battery negative electrode of the invention is applied.

<Positive Electrode>

The positive electrode is one where a positive electrode active material layer containing a positive electrode active material and a binder is formed on a current collector.

Positive Electrode Active Material

The following will describe the positive electrode active material (lithium-transition metal-based compound) to be used for the positive electrode.

Lithium-Transition Metal-Based Compound

The lithium-transition metal-based compound is a compound having a structure capable of eliminating and inserting Li ions, and examples thereof include sulfides, phosphate salt compounds, lithium-transition metal composite oxides, and the like.

Examples of the sulfides include compounds having a two-dimensional layered structure, such as $TiS_2$ or $MoS_2$, Chevrel compounds having a strong three-dimensional skeleton structure represented by the general formula $Me_xMo_6S_8$ (Me represents any of various transition metals including Pb, Ag, and Cu), and the like.

Examples of the phosphate salt compounds include those belonging to an olivine structure and the compounds are generally represented by $LiMePO_4$ (Me represents at least one transition metal). Specifically, examples thereof include $LiFePO_4$, $LiCoPO_4$, $LiNiPO_4$, $LiMnPO_4$, and the like.

Examples of the lithium-transition metal composite oxides include those belonging to a spinel structure in which three-dimensional diffusion is possible or a layered structure that makes two-dimensional diffusion of lithium ions possible.

One having a spinel structure is generally represented by $LiMe_2O_4$ (Me represents at least one transition metal). Specifically, examples thereof include $LiMn_2O_4$, $LiCoMnO_4$, $LiNi_{0.5}Mn_{1.5}O_4$, $LiCoVO_4$, and the like.

One having a layered structure is generally represented by $LiMeO_2$ (Me represents at least one transition metal). Specifically, examples thereof include $LiCoO_2$, $LiNiO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{1.2}Cr_{0.4}Ti_{0.4}O_2$, $LiMnO_2$, and the like.

Composition

Moreover, the lithium-containing transition metal compound is, for example, a lithium-transition metal-based compound represented by the following compositional formula (A) or (B).

1) In the case of lithium-transition metal-based compound represented by the following compositional formula (A)

$$Li_{1+x}MO_2 \tag{A}$$

In the formula, x is usually 0 or more and 0.5 or less. M is an element composed of Ni and Mn or Ni, Mn, and Co and a molar ratio Mn/Ni is usually 0.1 or more and 5 or less. A molar ratio Ni/M is usually 0 or more and 0.5 or less. A molar ratio Co/M is usually preferably 0 or more and 0.5 or less. In this regard, there is also a case where an excess of Li represented by x is replaced by the transition metal site M.

In the above compositional formula (A), the atomic ratio of oxygen is described to be 2 for convenience but slight non-stoichiometry may be present. Moreover, x in the above compositional formula is a feed composition at the production stage of the lithium-transition metal-based compound. Usually, a commercially available battery has undergone aging after assembling the battery. Therefore, with charging and discharging, the Li quantity of the positive electrode sometimes suffers a loss. In that case, upon compositional analysis, x is sometimes measured to be −0.65 or more and 1 or less in the case of discharging to 3V.

Moreover, as the lithium-transition metal-based compound, one baked by performing high-temperature baking under an oxygen-containing gas atmosphere for increasing crystallinity of the positive electrode active material is excellent in battery characteristics.

Furthermore, the lithium-transition metal-based compound represented by the compositional formula (A) may be a solid solution with $Li_2MO_3$ called a 213 layer as shown by the following general formula (A').

$$\alpha Li_2MO_3 \cdot (1-\alpha)LiM'O_2 \tag{A'}$$

In the general formula, α is a numeral satisfying 0<α<1.

M is at least one metal element whose average oxidation number is 4⁺. Specifically, it is at least one metal element selected from the group consisting of Mn, Zr, Ti, Ru, Re, and Pt.

M' is at least one metal element whose average oxidation number is 3⁺, and is preferably at least one metal element selected from the group consisting of V, Mn, Fe, Co, and Ni and more preferably at least one metal element selected from the group consisting of Mn, Co, and Ni.

2) In case of lithium-transition metal-based compound represented by following general formula (B)

$$Li[Li_aM_bMn_{2-b-a}]O_{4+\delta} \tag{B}$$

In the formula, M is an element composed of at least one of transition metals selected from Ni, Cr, Fe, Co, Cu, Zr, Al, and Mg.

The value of b is usually preferably 0.4 or more and 0.6 or less. When the value of b falls within the range, energy density per unit weight in the lithium-transition metal-based compound is high.

Moreover, the value of a is usually preferably 0 or more and 0.3 or less. Also, a in the above compositional formula is a feed composition at the production stage of the lithium-transition metal-based compound. Usually, a commercially available battery has undergone aging after assembling the battery. Therefore, with charging and discharging, the Li quantity of the positive electrode sometimes suffers a loss. In that case, upon compositional analysis, a is sometimes measured to be −0.65 or more and 1 or less in the case of discharging to 3V. When the value of a falls within the range, energy density per unit weight in the lithium-transition metal-based compound is not considerably impaired and a good load characteristic is obtained.

Furthermore, the value of δ is usually preferably in the range of ±0.5. When the value of δ falls within the range, stability as a crystalline structure is high and the cycle characteristics and high-temperature storage of a battery having an electrode prepared using the lithium-transition metal-based compound are good.

Here, the following will more precisely describe chemical meanings of the lithium composition in a lithium-nickel-manganese-based composite oxide that is a composition of the lithium-transition metal-based compound. For determining a and b in the compositional formula of the lithium-transition metal-based compound, they are calculated by analyzing each transition metal and lithium on an inductively coupled plasma-atomic emission spectrometry apparatus (ICP-AES) and determining the ratio of Li/Ni/Mn.

From a structural viewpoint, lithium relating to a is considered to be incorporated by replacement in the same transition metal site. Here, owing to the lithium relating to a, the average valency of M and manganese becomes larger than 3.5 according to the principle of charge neutralization.

Moreover, the above lithium-transition metal-based compound may be substituted with fluorine and is represented by $LiMn_2O_{4-x}F_{2x}$.

Blend: Specific examples of the lithium-transition metal-based compound having the above composition include $Li_{1+x}Ni_{0.5}Mn_{0.5}O_2$, $Li_{1+x}Ni_{0.85}Co_{0.10}Al_{0.05}O_2$, $Li_{1+x}Ni_{0.33}Mn_{0.33}Co_{0.33}O_2$, $Li_{1+x}Ni_{0.45}Mn_{0.45}Co_{0.1}O_2$, $Li_{1+x}Mn_{1.8}Al_{0.2}O_4$, $Li_{1-x}Mn_{1.5}Ni_{0.5}O_4$, and the like. These lithium-transition metal-based compounds may be used singly or two or more thereof may be used as a blend.

Incorporation of Foreign Element: Also, a foreign element may be introduced into the lithium-transition metal-based compound. The foreign element is selected from any one or more of B, Na, Mg, Al, K, Ca, Ti, V, Cr, Fe, Cu, Zn, Sr, Y, Zr, Nb, Ru, Rh, Pd, Ag, In, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, S, Cl, Br, I, As, Ge, P, Pb, Sb, Si, and Sn.

These foreign elements may be incorporated into the crystalline structure of the lithium-transition metal-based compound or may be unevenly distributed on the particle surface, crystal grain boundary, and the like as a simple substance or a compound without being incorporated into the crystalline structure of the lithium-transition metal-based compound.

<Positive Electrode for Lithium Secondary Battery>

A positive electrode for a lithium secondary battery is obtained by forming a positive electrode active material layer containing the aforementioned lithium-transition metal-based compound for a lithium secondary battery positive electrode material and a binding agent on a current collector.

The positive electrode active material layer is usually formed by adhering a sheet to a positive electrode current collector under pressure, the sheet being obtained by dry-mixing the positive electrode material, the binding agent, and further a conductive material, a thickener, and the like to be used as required and forming the resulting mixture into a sheet form, or by dissolving or dispersing these materials in a liquid medium to form a slurry, applying it on a positive electrode current collector, and drying it.

As a material for the positive electrode current collector, usually, a metal material such as aluminum, stainless steel, nickel-plated one, titanium, or tantalum or a carbon material such as carbon cloth or carbon paper is employed. Also, as a form, there may be mentioned a metal foil, a metal cylinder, a metal coil, a metal plate, a metal thin film, expanded metal, punched metal, foam metal, and the like in the case of metal materials and a carbon plate, a carbon thin film, a carbon cylinder, and the like in the case of carbon materials. The thin film may be appropriately formed in a mesh form.

In the case of using a thin film as the positive electrode current collector, the thickness is arbitrary but is usually preferably in the range of 1 μm or more and 100 mm or less. When the thickness is less than the above range, there is a possibility that strength required for the current collector is insufficient. On the other hand, when the thickness is more than the above range, there is a possibility that handling properties are impaired.

The binding agent for use in the production of the positive electrode active material layer is not particularly limited and, in the case of a coating method, the agent may be sufficiently a stable material against a liquid medium for use in the electrode production. Specific examples thereof include resin polymers such as polyethylene, polypropylene, polyethylene terephthalate, polymethyl methacrylate, aromatic polyamides, cellulose, and nitrocellulose; rubber polymers such as SBR (styrene-butadiene rubber), NBR (acrylonitrile-butadiene rubber), fluororubber, isoprene rubber, butadiene rubber, and ethylene-propylene rubber; thermoplastic elastomer polymers such as styrene-butadiene-styrene block copolymer and hydrogenated products thereof, EPDM (ethylene-propylene-diene terpolymer), styrene-ethylene-butadiene-ethylene copolymer, and styrene-isoprene-styrene block copolymer and hydrogenated products thereof; soft resin polymers such as syndiotactic 1,2-polybutadiene, polyvinyl acetate, ethylene-vinyl acetate copolymer, and propylene-α-olefin copolymers; fluorocarbon polymers such as polyvinylidene fluoride, polytetrafluoroethylene, fluorinated polyvinylidene fluoride, and polytetrafluoroethylene-ethylene copolymer; polymer compositions having ionic conductivity of an alkali metal ion (particularly a lithium ion); and the like. These substances may be used singly or two or more thereof may be used in any combination and ratio.

The ratio of the binding agent in the positive electrode active material layer is usually preferably 0.1% by mass or more and 80% by mass or less. When the ratio of the binding agent is too low, the positive electrode active material cannot be sufficiently held and mechanical strength of the positive electrode is insufficient, so that there is a possibility of deterioration of battery performance in the cycle characteristics or the like. On the other hand, when the ratio is too high, there is a possibility that the case results in a decrease in battery capacity and conductivity.

Into the positive electrode active material layer, a conductive material is incorporated for increasing conductivity. The type thereof is not particularly limited but specific examples include metal materials such as copper and nickel, carbon materials including graphite such as natural graphite and artificial graphite, carbon black such as acetylene black, amorphous carbon such as needle cokes, and the like. These substances may be used singly or two or more thereof may be used in any combination and ratio. The ratio of the conductive material in the positive electrode active material layer is usually preferably 0.01% by mass or more and 50% by mass or less. When the ratio of the conductive material is too low, conductivity sometimes becomes insufficient. When the ratio is too high, battery capacity sometimes decreases.

As the liquid medium for forming the slurry, the type thereof is not particularly limited as far as it can dissolve or disperse the lithium-transition metal-based compound powder that is a positive electrode material, the binding agent, and the conductive material and the thickener which are used according to needs, and either of an aqueous solvent or an organic solvent may be used.

Examples of the aqueous solvent include water, alcohols, and the like. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, ethylene oxide, tetrahydrofuran (THF), toluene, acetone, dimethyl ether, dimethylacetamide, hexamethylphosphramide, dimethyl sulfoxide, benzene, xylene, quinoline, pyridine, methylnaphthalene, hexane, and the like. Particularly in the case of using the aqueous solvent, a dispersant is added in addition to the thickener, and a slurry is formed using a latex such as SBR. These solvents may be used singly or two or more thereof may be used in any combination and ratio.

The content of the lithium-transition metal-based compound powder as the positive electrode material in the positive electrode active material layer is usually preferably 10% by mass or more and 99.9% by mass or less. When the ratio of the lithium-transition metal-based compound powder in the positive electrode active material layer is too high, the strength of the positive electrode tends to be insufficient. When the ratio is too low, the capacity sometimes becomes insufficient.

Moreover, the thickness of the positive electrode active material layer is usually preferably about 10 to 200 μm. The electrode density of the positive electrode after pressing is usually preferably 2.2 g/cm$^3$ or more and 4.2 g/cm$^3$ or less. In this regard, the positive electrode active material layer obtained by application and drying is preferably compacted by means of a roller press or the like for increasing the packing density of the positive electrode active material. Thus, the positive electrode for a lithium secondary battery can be prepared.

<Nonaqueous Electrolyte>

Examples of the nonaqueous electrolyte include known nonaqueous electrolytic solutions, polymer solid electrolytes, gel-like electrolytes, inorganic solid electrolytes, and the like. Of these, the nonaqueous electrolytic solutions are preferred. A nonaqueous electrolytic solution is composed by dissolving a solute (electrolyte) into a nonaqueous solvent.

<Electrolyte>

The electrolyte for use in the nonaqueous electrolytic solution is not limited and any known one usable as an electrolyte can be arbitrarily adopted and incorporated. In the case where the nonaqueous electrolytic solution of the invention is used in a nonaqueous electrolytic solution secondary battery, a lithium salt is preferred as the electrolyte.

Specific examples of the electrolyte include $LiPF_6$, $LiBF_4$, $LiCF_3SO_3$, $LiN(CF_3SO_2)_2$, $LiN(C_2F_5SO_2)_2$, lithium bis(oxalato)borate, lithium difluorooxalatoborate, lithium tetrafluorooxalatophosphate, lithium difluorobis(oxalato)phosphate, lithium fluorosulfonate, and the like. These electrolytes may be used singly or two or more thereof may be used in any combination and ratio.

The concentration of the lithium salt in the electrolyte is arbitrary but is in the range of usually preferably 0.5 mol/L or more, more preferably 0.6 mol/L or more, and further preferably 0.8 mol/L or more and usually preferably 3 mol/L or less, more preferably 2 mol/L or less, and further preferably 1.5 mol/L or less. When the total molar concentration of the lithium salt is in the above range, the electric conductivity of the electrolytic solution becomes sufficient and, on the other hand, a decrease in the electric conductivity and a decrease in the battery performance owing to an increase in viscosity can be prevented.

<Nonaqueous Solvent>

The nonaqueous solvent to be contained in the nonaqueous electrolytic solution is not particularly limited as far as it is a solvent that does not adversely influence the battery characteristics at the time when used as a battery. Examples of the nonaqueous solvent usually used include chain carbonates such as dimethyl carbonate, ethyl methyl carbonate, and diethyl carbonate; cyclic carbonates such as ethylene carbonate, propylene carbonate, and butylene carbonate; chain carboxylic acid esters such as methyl acetate, ethyl acetate, methyl propionate, and ethyl propionate; cyclic carboxylic acid esters such as γ-butyrolactone; chain ethers such as dimethoxyethane and diethoxyethane; cyclic ethers such as tetrahydrofuran, 2-methyltetrahydrofuran, and tetrahydropyran, nitriles such as acetonitrile, propionitrile, benzonitrile, butyronitrile, and valeronitrile; phosphoric acid esters such as trimethyl phosphate and triethyl phosphate; sulfur-containing compounds such as ethylene sulfite, 1,3-propanesultone, methyl methanesulfonate, sulfolane, and dimethylsulfone; and the like. In these compounds, a part of hydrogen atoms may be replaced by halogen atom(s).

They may be used singly or two or more thereof may be used in combination but it is preferred to use two or more compounds in combination. For example, it is preferred to use a solvent having a high dielectric constant such as a cyclic carbonate or a cyclic carboxylic acid ester and a solvent having a low viscosity such as a chain carbonate or a chain carboxylic ester in combination.

Here, the solvent having a high dielectric constant means a compound having a dielectric constant at 25° C. of 20 or more. Of the solvents having a high dielectric constant, it is preferred that the electrolytic solution contains ethylene carbonate, propylene carbonate and a compound in which hydrogen atom(s) thereof are replaced by another element such as halogen, an alkyl group, or the like. The ratio of the solvent having a high dielectric constant in the electrolytic solution is preferably 15% by mass or more, further preferably 20% by mass or more, and most preferably 25% by mass or more. When the content of the solvent having a high dielectric constant is lower than the above range, desired battery characteristics are not obtained in some cases.

<Auxiliaries>

In the nonaqueous electrolytic solution, other than the aforementioned electrolyte and the nonaqueous solvent, auxiliaries may be appropriately blended depending on the purpose. As an auxiliary having an effect of improving battery life owing to formation of a film on the negative electrode surface, there may be, for example, mentioned unsaturated cyclic carbonates such as vinylene carbonate, vinylethylene carbonate, and ethynylethylene carbonate; cyclic carbonates having fluorine atom(s), such as fluoroethylene carbonate; and fluorinated unsaturated cyclic carbonates such as 4-fluorovinylene carbonate; and the like.

As an overcharge inhibitor that effectively suppress bursting and firing of a battery when the battery becomes in a state of overcharge or the like, there may be, for example, mentioned aromatic compounds such as biphenyl, cyclohexylbenzene, diphenyl ether, t-butylbenzene, t-pentylbenzene, diphenyl carbonate, and methyl phenyl carbonate; and the like.

As an auxiliary that improves the cycle characteristics and the low-temperature discharge characteristic, there may be, for example, mentioned lithium salts such as lithium monofluorophosphate, lithium difluorophosphate, lithium fluorosulfonate, lithium bis(oxalato)borate, lithium difluruorooxalatoborate, lithium tetrafluorooxalatophosphate, and lithium difluorobis(oxalato)phosphate; and the like.

As an auxiliary that can improve a capacity retention characteristic after high-temperature storage and the cyclic characteristics, there may be, for example, mentioned sulfur-containing compounds such as ethylene sulfite, propanesultone, and propenesultone; carboxylic anhydrides such as succinic anhydride, maleic anhydride, and citraconic anhydride; nitrile compounds such as succinonitrile, glutaronitrile, adiponitrile, and pimeronitrile. The amounts of the auxiliaries to be blended are not particularly limited and are arbitrary unless the advantages of the invention are not remarkably impaired.

<Separator>

Between the positive electrode and the negative electrode, a separator is usually disposed for preventing a short circuit. In this case, the nonaqueous electrolytic solution of the invention is usually used after impregnating the separator therewith.

The material and form of the separator are not particularly limited and known ones can be arbitrarily adopted unless the advantages of the invention are not impaired. Particularly, a resin, a glass fiber, an inorganic material, or the like formed of a stable material against the nonaqueous electrolytic solution of the invention is used, and it is preferred to use a porous sheet or nonwoven fabric-form one, or the like which is excellent in liquid retentiveness.

Examples of the material of the resin or glass fiber separator include polyolefins such as polyethylene and polypropylene, aromatic polyamides, polytetrafluoroethylene, polyether sulfone, glass filters, and the like. Of these, preferred are glass filters and polyolefins, and further preferred are polyolefins. These materials may be used singly or two or more thereof may be used in any combination and ratio.

The thickness of the separator is arbitrary but is usually preferably 1 μm or more, more preferably 5 μm or more, and further preferably 10 μm or more and is usually preferably 50 μm or less, more preferably 40 μm or less, and further preferably 30 μm or less. When the separator is thinner than the above range, insulation properties and mechanical strength decrease in some cases. Moreover, when it is thicker than the above range, not only the battery performance such as the rate characteristic decreases in some cases but also the energy density of the whole nonaqueous electrolytic solution secondary battery decreases in some cases.

Furthermore, in the case where a porous one such as a porous sheet or a nonwoven fabric is used as the separator, the porosity of the separator is arbitrary but is usually preferably 20% or more, more preferably 35% or more, and further preferably 45% or more and is usually preferably 90% or less, more preferably 85% or less, and further preferably 75% or less. When the porosity is exceedingly less than the above range, membrane resistance increases and the rate characteristic tends to become worse. Moreover, when it is exceedingly larger than the above range, the mechanical strength of the separator decreases and the insulation properties tend to decrease.

Also, the average pore size of the separator is arbitrary but is usually preferably 0.5 μm or less and more preferably 0.2 μm or less and is usually preferably 0.05 μm or more. When the average pore size is more than the above range, short circuit is prone to occur. Moreover, when it is less than the above range, membrane resistance increases and the rate characteristic tends to decrease.

On the other hand, examples of the inorganic material include oxides such as alumina and silicon dioxide, nitrides such as aluminum nitride and silicon nitride, sulfate salts such as barium sulfate and calcium sulfate. Moreover, as the shape, there may be, for example, mentioned a particulate shape or a fiber shape.

As the form, thin-film-form one such as a nonwoven fabric, a woven fabric, or a fine porous film is used. In the thin-film form, one having a pore size of 0.01 to 1 μm and a thickness of 5 to 50 μm is suitably employed. Other than the above independent thin-film form, use can be made a separator obtained by forming a composite porous layer containing particles of the above inorganic substance on the surface layer of the positive electrode and/or the negative electrode using a resin-made binding agent. For example, it is mentioned to form a porous layer of alumina particles having a 90% particle size of less than 1 μm on both surfaces of the positive electrode using a fluorocarbon resin as a binding agent.

The characteristics of the separator in the nonaqueous electrolytic solution secondary battery can be grasped by a Gurley value. The Gurley value indicates difficulty of air permeation in a thickness direction of a film. Since the value is represented by the number of seconds necessary for the permeation of 100 ml of air through the film, a smaller numeral value means that air easily passes through and a larger numeral value means that air is difficult to pass through. Namely, a smaller numeral value means that communication ability in a thickness direction of the film is good and a larger numeral value means that the communication ability in a thickness direction of the film is bad.

The communication ability is a degree of communication of pores in a thickness direction of a film. When the Gurley value of the separator of the invention is low, the separator can be used in various uses. For example, in the case of using it as a separator of a nonaqueous lithium secondary battery, the low Gurley value means that the migration of lithium ions is easy and thus the battery is excellent in the battery performance, so that the case is preferable.

The Gurley value of the separator is arbitrary but is preferably 10 to 1,000 second/100 ml, more preferably 15 to 800 second/100 ml, and further preferably 20 to 500 second/100 ml. When the Gurley value is 1,000 second/100 ml or less, substantially, the electric resistance is low and hence the separator is preferable as a separator.

<Battery Design>

Electrode Group

The electrode group may be either of one having a layered structure in which the above positive electrode plate and negative electrode plate are disposed through the above separator intervening therebetween and one having a structure in which the above positive electrode plate and negative electrode plate are spirally wound up through the above separator intervening therebetween. The ratio of volume of the electrode group in the volume of the battery (hereinafter referred to as electrode group occupancy rate) is usually preferably 40% or more and more preferably 50% or more and is usually preferably 90% or less and more preferably 80% or less.

When the electrode group occupancy rate is less than the above range, the battery capacity decreases. Moreover, when the rate is more than the above range, void space is little and thus, when the battery becomes a high temperature, the members are expanded and vapor pressure of the liquid component of the electrolyte is increased to elevate the inner pressure, so that there is a case where various characteristics such as charge-discharge repeating performance and high-temperature storage as a battery are decreased and further a gas releasing valve that releases the inner pressure outside operates.

<Outer Packaging Case>

The material of the outer packaging case is not particularly limited as far as it is a stable material against the nonaqueous electrolytic solution to be used. Specifically, examples thereof include metals such as nickel-plated sheet steel, stainless steel, aluminum or aluminum alloys, and magnesium alloys; and laminate films of a resin and an aluminum foil. Of these, in view of weight saving, a metal of aluminum or an aluminum alloy or a laminate film is preferred.

In the outer packaging case using a metal, there may be mentioned one forming an encapsulated sealed structure by welding metals each other by laser welding, resistance welding, or ultrasonic welding or one forming a crimped structure through a resin-made gasket using the above metal.

In the outer packaging case using the above laminate film, there may be mentioned one forming an encapsulated sealed structure by heat-sealing resin layers each other and the other one. For increasing sealing ability, a resin different from the resin for use as the laminate film may intervene between the above resin layers.

Particularly, in the case where the resin layers are heat-sealed through a collecting terminal to form a sealed structure, the jointing is jointing of a metal with a resin, so that a resin having a polar group or a modified resin into which a polar group is introduced is suitably used as an intervening resin.

<Protection Device>

As a protection device, use can be made PTC (Positive Temperature Coefficient) in which resistance increases when an abnormal heat is generated or an over current flows, a thermal fuse, a thermistor, a valve (current breaker valve) that shuts off the current flowing in a circuit through sharp increase of inner pressure or inner temperature of the battery at the time of the abnormal heat generation, or the like. As the above protection device, it is preferred to select one that does not act at usual use under a high current. More preferred is a design which does not result in abnormal heat generation or thermal runaway even when the protection device is not present.

<Outer Package>

The nonaqueous electrolytic solution secondary battery of the invention is usually composed by placing the above nonaqueous electrolytic solution, the negative electrode, the positive electrode, the separator, and the like in an outer package. The outer package is not particularly limited and known one can be arbitrarily adopted unless the advantages of the invention are not remarkably impaired. Specifically, the material of the outer package is arbitrary but, usually, for example, nickel-plated iron, stainless steel, aluminum or an alloy thereof, nickel, titanium, or the like is used.

Moreover, the shape of the outer package is also arbitrary and may be, for example, any of cylindrical one, square-shaped one, laminated one, coin-shaped one, or large-sized one.

EXAMPLES

The following will describe specific embodiments of the invention further in detail but the invention should not be construed as being limited to these examples.

Example 1

Pitch as a low crystalline carbon precursor was thoroughly mixed into spheroidized natural graphite (A) having a specific surface area of 8.2 m$^2$/g and a tapping density of 0.85 g/cm$^3$ as nuclear graphite at a temperature at which the pitch formed a liquid phase, followed by performing a baking treatment at a maximum temperature of 1,000° C. in an inert gas (including an atmosphere of a gas generated from the precursor).

Thereafter, the baked product was treated in a turbo mill (manufactured by Turbo Corporation) at 2,000 rpm to obtain an amorphous carbon-coated multilayer-structured carbon raw material (also referred to as amorphous multilayer-structured carbon raw material) (1) that was a multilayered carbon structure in which a carbonaceous material having different crystallinity was deposited on the surfaces of particles of the spheroidized natural graphite (A).

The turbo mill is a continuous pulverization apparatus. Since it was impossible to measure the energy for pulverization directly, a maximum energy imparted to the treated product per unit weight was estimated from the rated output 0.75 kW of the pulverizer and the treated amount per hour.

Based on a baking actual carbon ratio, it was confirmed that the resulting negative electrode active material powder was coated with 5.9 parts by weight of the low crystalline carbonaceous material for 94.1 parts by weight of graphite. Furthermore, a cracking treatment was performed at 520 rpm for 15 minutes under a condition of an oxygen concentration of 20% (atmospheric air composition) in an apparatus (effective volume: 200 L) which had a rod-like metal portion fixed to an inside of the apparatus, of which inside had a cylindrical shape having a radius of 38 cm and a height of 95 cm, and moves relatively to the portion with maintaining a certain clearance. In this regard, the amount to be treated at one time was set at 100 kg. The resulting treated product was classified with vibration using a round sieve having an aperture of 45 μm to obtain an amorphous multilayer-structured carbon material (2).

Example 2

An amorphous multilayer-structured carbon material (3) was obtained in the same manner as in Example 1 except that the cracking treatment in Example 1 was performed at 520 rpm for 45 minutes under a condition of an oxygen concentration of 20% (atmospheric air composition).

Example 3

An amorphous multilayer-structured carbon material (4) was obtained in the same manner as in Example 1 except that the cracking treatment in Example 1 was performed at 749 rpm for 20 minutes under a condition of an oxygen concentration of 20% (atmospheric air composition) and the amount to be treated at one time was set at 110 kg.

Example 4

An amorphous multilayer-structured carbon material (5) was obtained in the same manner as in Example 1 except that the amorphous multilayer-structured carbon raw material (1) that was an intermediate material of Example 1 was subjected to a cracking treatment at 2,633 rpm for 15 minutes under a condition of an oxygen concentration of 20% (atmospheric air composition) in an apparatus (effective volume: 1.2 L) which had a rod-like metal portion fixed to an inside of the apparatus, of which inside had a cylindrical shape having a diameter of 8 cm and a height of 13 cm, and moves relatively to the portion with maintaining a certain clearance and the amount to be treated at one time was set at 0.6 kg.

Comparative Example 1

The amorphous multilayer-structured carbon raw material (1) that was an intermediate material of Example 1 was classified with vibration using a round sieve having an aperture of 45 μm to obtain an amorphous multilayer-structured carbon material (6).

Comparative Example 2

Spheroidized natural graphite (B) having a specific surface area of 7.8 m$^2$/g and a tapping density of 0.96 g/cm$^3$ as nuclear graphite and a binder capable of graphitization were mixed at a weight ratio of 100:30 at a temperature equal to or higher than the softening point and the resulting mixture was charged into a kneader having a stirring blade heated to a temperature equal to or higher than the softening point beforehand and was mixed for 20 minutes.

The thoroughly kneaded mixture was packed into a mold of a mold press machine equal to or higher than the softening point beforehand, and was press-molded to obtain a molded article. The composite molded article of the Spheroidized natural graphite and the graphite crystal precursor powder was taken out.

The resulting molded article was heated from room temperature to 1,000° C. in an electric furnace to perform removal of volatile components and baking. Then, the obtained molded article was heated in a direct electric furnace at 3,000° C. under an inert atmosphere to achieve graphitization.

After the obtained graphite molded article was roughly crushed, it was finely pulverized in a mill where the number of rotations of the pulverizing blade was set at 8,000 rpm. Furthermore, the resulting treated product was classified with vibration using a round sieve having an aperture of 45 μm to obtain a graphite carbon-coated multilayer-structured carbon material (also referred to as graphite carbon multilayer-structured carbon material) (7).

Example 5

The graphite carbon multilayer-structured carbon material (7) obtained in Comparative Example 2 (in Example 5, the material is used as a carbon raw material before treatment) was further subjected to a cracking treatment at 2,000 rpm for 3 minutes under a condition of an oxygen concentration of 20% (atmospheric air composition) in an apparatus (effective volume: 0.3 L) which had a rod-like metal portion fixed to an inside of the apparatus, of which inside had a cylindrical shape having a radius of 10 cm and a height of 7 cm, and moves relatively to the portion with maintaining a certain clearance. In this regard, the amount to be treated at one time was set at 0.2 kg. The resulting treated product was classified with vibration using a round sieve having an aperture of 45 μm to obtain a graphite carbon multilayer-structured carbon material (8) which was obtained by the cracking treatment of the graphite carbon multilayer-structured carbon raw material (7).

Comparative Example 3

Spheroidized natural graphite having a specific surface area of 4.9 m$^2$/g and a tapping density of 1.02 g/cm$^3$ as nuclear graphite was classified with vibration using a round sieve having an aperture of 45 μm to obtain spheroidized natural graphite (C).

Comparative Example 4

The spheroidized natural graphite (C) was subjected to a cracking treatment at 2,633 rpm for 60 minutes under a condition of an oxygen concentration of 20% (atmospheric air composition) in an apparatus (effective volume: 1.2 L) which had a rod-like metal portion fixed to an inside of the apparatus, of which inside had a cylindrical shape having a diameter of 8 cm and a height of 13 cm, and moves relatively to the portion with maintaining a certain clearance. In this regard, the amount to be treated at one time was set at 0.6 kg. The resulting treated product was classified with vibration using a round sieve having an aperture of 45 μm to obtain a spheroidized natural graphite-treated product (9).

Example 6

Pitch as a low crystalline carbon precursor was thoroughly mixed into spheroidized natural graphite (D) having a specific surface area of 9.7 m$^2$/g and a tapping density of 0.86 g/cm$^3$ as nuclear graphite at a temperature at which the pitch formed a liquid phase, followed by performing a baking treatment at a maximum temperature of 1,000° C. in an inert gas.

Thereafter, the baked product was treated in a turbo mill (manufactured by Turbo Corporation) at 2,000 rpm to obtain an amorphous carbon-coated multilayer-structured carbon raw material (also referred to as amorphous multilayer-structured carbon raw material) (10) that was a multilayered carbon structure in which a carbonaceous material having different crystallinity was deposited on the surfaces of particles of the spheroidized natural graphite (D).

Based on a baking actual carbon ratio, it was confirmed that the resulting negative electrode active material powder was coated with 5.2 parts by weight of the low crystalline carbonaceous material for 94.8 parts by weight of graphite. The obtained multilayer-structured carbon raw material (10) was subjected to a cracking treatment at 2,633 rpm for 60 minutes under a condition of an oxygen concentration of 20% (atmospheric air composition) in an apparatus (effective volume: 1.2 L) which had a rod-like metal portion fixed to an inside of the apparatus, of which inside had a cylindrical shape having a diameter of 8 cm and a height of 13 cm, and moves relatively to the portion with maintaining a certain clearance.

In this regard, the amount to be treated at one time was set at 0.6 kg. The resulting treated product was classified with vibration using a round sieve having an aperture of 45 μm to obtain an amorphous multilayer-structured carbon material (11).

Comparative Example 5

The amorphous multilayer-structured carbon raw material (10) that was an intermediate material of Example 6 was classified with vibration using a round sieve having an aperture of 45 μm to obtain an amorphous multilayer-structured carbon material (12).

Table 1 shows detailed treatment conditions for Examples 1 to 6 and Comparative Examples 1 to 5, and Table 2 shows physical properties of the obtained materials and results evaluated by the following evaluation methods. Precipitating ability and coating ability of slurries were all satisfactory.

Preparation of Battery
(Preparation of Negative Electrode)

To 97.7 parts by weight of a multilayer-structured carbon material as a negative electrode active material were added 130 parts by weight of an aqueous dispersion of carboxymethylcellulose sodium (concentration of carboxymethylcellulose sodium: 1% by mass) and 2.5 parts by weight of an aqueous dispersion of styrene-butadiene rubber (concentration of styrene-butadiene rubber: 40% by mass) as a thickener and a binding agent, respectively, followed by mixing in a rotation and revolution mixer to form a slurry.

The obtained slurry was applied on one surface of a rolled copper foil of 10 μm and dried. After the resulting one was rolled on a press machine, the rolled one was cut into a shape having a width of 32 mm and a length of 42 mm as a size of the active material layer and having an uncoated portion as a current collector tab welding portion to form a negative electrode. At this time, the density of the negative electrode active material was 1.35 g/cm$^3$ and total weight of the negative electrode active material, the thickener, and the binding agent per unit area was 6.0 mg/cm$^2$.

The coating ability of the resulting slurry was evaluated by the state of the electrode and the precipitating ability after 1 day standing was visually evaluated.
(Preparation of Positive Electrode)

The positive electrode active material is a lithium-transition metal composite oxide synthesized by the method shown below and is represented by the compositional formula $LiMn_{0.33}Ni_{0.33}CO_{0.33}O_2$. $Mn_3O_4$ as a manganese raw material, NiO as a nickel raw material, and $Co(OH)_2$ as a cobalt raw material were weighed so as to be a molar ratio of Mn:Ni:Co=1:1:1 and pure water was added thereto to form a slurry. While stirring, solid matter in the slurry was wet-pulverized so as to be a median diameter of 0.2 µm using a circulating medium-stirring wet bead mill.

The slurry was spray-dried by means of a spray drier to obtain almost spherical granulated particles having a particle size of about 5 µm, which was solely composed of the manganese raw material, the nickel raw material, and the nickel raw material. A LiOH powder having a median diameter of 3 µm was added to the obtained granulated particles so that the molar ratio of Li to the total number of moles of Mn, Ni, and Co became 1.05, and the whole was mixed by means of a high-speed mixer to obtain a mixed powder of the nickel raw material, the nickel raw material, the manganese raw material, and the lithium raw material.

After the mixed powder was baked at 950° C. for 12 hours (temperature-increasing/decreasing rate: 5° C./min) under an air stream, the baked one was cracked and put through a sieve having an aperture of 45 µm to obtain a positive electrode active material. The BET specific surface area of the positive electrode active material was 1.2 $m^2$/g, the average primary particle size was 0.8 µm, and the median diameter $d_{50}$ was 4.4 µm, and the tapping density was 1.6 g/$cm^3$.

Then, 90% by mass of the aforementioned positive electrode active material, 7% by mass of acetylene black as a conductive material, and 3% by mass of polyvinylidene fluoride (PVdF) as a binding agent were mixed in N-methylpyrrolidone solvent to form a slurry. The resulting slurry was applied on an aluminum foil of 15 µm and dried. After the resulting one was rolled on a press machine, the rolled one was cut into a shape having a width of 30 mm and a length of 40 mm as a size of the positive electrode active material layer and having an uncoated portion for power collection to form a positive electrode. The density of the positive electrode active material layer was 2.60 g/$cm^3$ and total weight of the positive electrode active material, the binding agent, and the conductive material per unit area was 12.8 mg/$cm^2$.

(Preparation of Electrolytic Solution)

A solution obtained by dissolving under an inactive atmosphere, thoroughly dried lithium hexafluorophosphate ($LiPF_6$) in a mixture of ethylene carbonate (EC), dimethyl carbonate (DMC), and ethyl methyl carbonate (EMC) (volume ratio=3:3:4) in a concentration of 1 mol/L.

(Preparation of Battery)

One sheet of a positive electrode and one sheet of a negative electrode were disposed so that the active material surfaces faced each other and a separator of a porous polyethylene sheet (21 µm) was sandwiched between the electrodes. On this occasion, the positive electrode active material surface was faced so that it was not out of the multilayer-structured carbon material surface. A power-collecting tab was welded to the uncoated portion of each of the positive electrode and the negative electrode to form an electrode. Using a laminate sheet (total thickness: 0.1 mm) obtained by laminating a propylene film, an aluminum foil having a thickness of 0.04 mm, and a Nylon film in this order, the electrode was sandwiched between the laminate sheets so that the polypropylene sheet came to an inner side, and regions at which no electrode existed were heat-sealed except for one side for injecting the electrolytic solution. Thereafter, the nonaqueous electrolytic solution was injected into the active material layers in an amount of 200 µL and was thoroughly permeated into the electrodes. Then, the side was sealed to prepare a laminate cell. The rated capacity of the battery was 20 mAh.

Evaluation of Battery (Initial Efficiency/Capacity Measurement)

For the battery that had not undergone a charge-discharge cycle, two cycle initial charge and discharge was performed at 25° C. in a voltage range of 4.1 V to 3.0 V at a current value of 0.2 C (a current value for discharging in 1 hour the rated capacity determined by discharge capacity of hourly rate is taken as 1 C; the same shall apply hereinafter).

On this occasion, at the time of charging, constant-voltage charge was carried out at 4.1 V for 2.5 hours. The discharge capacity at the first cycle obtained here was divided by charge capacity and a value obtained by multiplying the quotient by 100 was taken as initial efficiency. Furthermore, the battery was charged until 4.1 V at 0.2 C and, after constant-voltage charge was carried out at 4.1 V for 2.5 hours, it was discharged at a current value of 0.33 C until 3.0 V. The discharge capacity at 0.33 C on this occasion was taken as initial discharge capacity. Then, output measurement was carried out.

A charge rate from a discharged state was determined based on the initial discharge capacity on this occasion.

(Output Measurement)

Under an environment of 25° C., charge was performed at a constant current of 0.33 C for 90 minutes. Then, after the battery was stored in a constant-temperature chamber at −30° C. for 3 hours or more, discharge was performed at each of 0.25 C, 0.50 C, 0.75 C, 1.00 C, 1.25 C, 1.50 C, 1.75 C, and 2.00 C for 2 seconds, and the voltage at the passage of 2 seconds was measured. The area of a triangle surrounded by the current-voltage straight line and the lower limit voltage (3 V) was taken as an output (W).

(Cycle Measurement)

Under an environment of 25° C., after discharge was performed until 3.0 V by a constant-current discharge at 0.33 C, charge was performed at 0.2 C for 240 minutes. Then, after the battery was stored in a constant-temperature chamber at 60° C. for 24 hours and further stored under an environment of 25° C. for 3 hours or more, constant-current discharge was performed at 0.33 C until 3.0 V.

The battery was again transferred to the constant-temperature chamber at 60° C. and, after 1 hour, repeated charge and discharge of performing charge at a constant current of 2 C until 4.1 V and then performing discharge at a constant current until 3.0 V was repeated 500 times. After the charge and discharge were repeated 500 times, the battery was stored under an environment of 25° C. for 3 hours or more and then discharge was performed at 0.33 C until 3.0 V.

(Capacity Measurement after Cycle)

After the cycle measurement was finished, the battery was charged at 0.2 C until 4.1 V and, after constant-voltage charge was carried out at 4.1 V for 2.5 hours, it was discharged at a current value of 0.33 C until 3.0 V. The discharge capacity on this occasion was taken as discharge capacity after cycle, and a cycle retention ratio was represented by (Discharge capacity after cycle)/(Initial discharge capacity)×100

TABLE 1

| | Treated amount (kg) | Effective volume (L) | Number of rotations (rpm) | Power at sample treatment (kW) | Power at idling (kW) | Power at treatment (kW) | Radius of treating vessel (mm) | Clearance (mm) | Peripheral velocity (m/min) | Atmosphere for treatment | Treatment time (min) | Power imparted for cracking treatment (W/kg) | Energy imparted to 1 g of carbon material (J/g) |
|---|---|---|---|---|---|---|---|---|---|---|---|---|---|
| Comparative Example 1 | — | — | — | — | — | — | — | — | — | — | — | 0 | <10 |
| Example 1 | 100 | 200 | 520 | 54 | 4 | 50 | 380 | 8 | 1242 | $O_2$ 20 mol % (Air) | 15 | 498 | 448 |
| Example 2 | 100 | 200 | 520 | 54 | 4 | 50 | 380 | 8 | 1242 | $O_2$ 20 mol % (Air) | 45 | 498 | 1344 |
| Example 3 | 110 | 200 | 749 | 144 | 13 | 131 | 380 | 10 | 1788 | $O_2$ 20 mol % (Air) | 20 | 1190 | 1427 |
| Example 4 | 0.6 | 1.2 | 2633 | 0.6 | 0.28 | 0.33 | 75 | 3 | 1241 | $O_2$ 20 mol % (Air) | 15 | 543 | 489 |
| Comparative Example 5 | — | — | — | — | — | — | — | — | — | — | — | 0 | <10 |
| Example 6 | 0.6 | 1.2 | 2633 | 0.6 | 0.28 | 0.32 | 75 | 3 | 1241 | $O_2$ 20 mol % (Air) | 60 | 533 | 1920 |
| Comparative Example 2 | — | — | — | — | — | — | — | — | — | — | — | 0 | <10 |
| Example 5 | 0.2 | 0.3 | 2000 | 1.16 | 0.48 | 0.68 | 100 | 5 | 1257 | $O_2$ 20 mol % (Air) | 3 | 3400 | 612 |
| Comparative Example 3 | — | — | — | — | — | — | — | — | — | — | — | 0 | 0 |
| Comparative Example 4 | 0.6 | 1.2 | 2633 | 0.6 | 0.28 | 0.32 | 75 | 3 | 1241 | $O_2$ 20 mol % (Air) | 30 | 533 | 960 |

TABLE 2

| | Average particle size d50 (μm) | Specific surface area ($m^2$/g) | True density (g/$cm^3$) | Tapping density (g/$cm^3$) | Void fraction calculated from tapping density (%) | Amount of oxygen-containing functional group O/C (atomic %) | Ratio of number of particle of 3 μm or less (%) | DBP oil absorption (ml/100 g) | Void fraction calculated from DBP oil absorption (%) | Void ratio (—) | Raman R value (—) | Initial efficiency (%) | Cycle retention ratio (%) | Low-temperature output (W) |
|---|---|---|---|---|---|---|---|---|---|---|---|---|---|---|
| Comparative Example 1 | 10.8 | 3.3 | 2.22 | 0.98 | 56.0 | 1.3 | 3 | 59.1 | 56.7 | 1.01 | 0.31 | 85 | 80.0 | 0.102 |
| Example 1 | 10.9 | 3.3 | 2.22 | 0.92 | 58.8 | 4.1 | 11 | 58.8 | 56.6 | 0.96 | 0.32 | 86 | 81.8 | 0.107 |
| Example 2 | 10.9 | 3.2 | 2.22 | 0.90 | 59.5 | 6.0 | 7 | 58.6 | 56.5 | 0.95 | 0.40 | 86 | 81.5 | 0.107 |
| Example 3 | 10.7 | 3.5 | 2.22 | 0.90 | 59.3 | 5.5 | 12 | 56.8 | 55.8 | 0.94 | — | 85 | 81.6 | 0.102 |
| Example 4 | 10.9 | 3.5 | 2.22 | 0.93 | 58.3 | 4.5 | 16 | 56.8 | 55.8 | 0.96 | — | 86 | 82.5 | 0.101 |
| Comparative Example 5 | 9.7 | 4.2 | 2.24 | 0.98 | 56.1 | 0.9 | — | 60.8 | 57.7 | 1.03 | 0.39 | 85 | 78.0 | 0.111 |
| Example 6 | 9.7 | 4.5 | 2.24 | 0.91 | 59.2 | 6.2 | — | 59.5 | 57.1 | 0.96 | 0.50 | 85 | 81.5 | 0.115 |
| Comparative Example 2 | 13.6 | 3.1 | 2.26 | 1.18 | 48.0 | 0.9 | 37 | 37.3 | 45.7 | 0.95 | 0.12 | 87 | 88.5 | 0.044 |
| Example 5 | 13.5 | 2.9 | 2.26 | 1.16 | 48.5 | 3.2 | 11 | 34.1 | 43.5 | 0.90 | 0.31 | 87 | 89.0 | 0.046 |
| Comparative Example 3 | 20.1 | 4.9 | 2.26 | 1.02 | 54.9 | 2.3 | — | 53.5 | 54.7 | 1.00 | — | 86 | 82.7 | 0.085 |
| Comparative Example 4 | 20.3 | 5.0 | 2.26 | 0.96 | 57.5 | 3.6 | — | 46.5 | 51.2 | 0.89 | — | 86 | 82.4 | 0.086 |

From the above results, it is understood that an improvement in the cycle characteristics is obtained while maintaining the initial efficiency when the multilayer-structured carbon material is produced under specific cracking conditions defined by the invention. As the main cause, it is understood that the void ratio is reduced in all cases by subjecting the multilayer-structured carbon raw material to a specific cracking treatment. It is considered that the results are attributable to a reduction of voids among particles and an increase in O/C by disintegrating fine agglomerated portion present in the carbon (amorphous carbon) or graphite carbon-coated multilayer-structured carbon raw material by the cracking treatment in all cases.

When these results are summarized, by imparting oxygen-containing functional groups onto the particle surface from a surrounding gas in the apparatus while cracking the particle fine agglomeration of the multilayer-structured carbon raw material that tends to leave agglomerated particles, it becomes possible to realize both of a decrease in the DBP oil absorption (an improvement in paste properties) attributable to the reduction of the fine agglomeration and a decrease in the tapping density deeply relevant to contact area, the tapping density influencing the improvement in the cycle characteristics. It is understood that these effects are not exhibited for natural graphite but are exhibited by the surface state of the multilayer-structured carbon material.

While the invention has been described in detail with reference to specific examples thereof, it will be apparent to one skilled in the art that various changes and modifications can be made therein without departing from the spirit and scope thereof. The present application is based on Japanese Patent Application No. 2010-244346 filed on Oct. 29, 2010, and the whole contents are incorporated herein by reference.

INDUSTRIAL APPLICABILITY

The multilayer-structured carbon material of the present invention can provide a nonaqueous electrolytic solution secondary battery that can improve trade-off relationships and exhibit good performance in paste properties, initial efficiency, cycle characteristics, low-temperature output, and the like when the material is used as a negative electrode material for a nonaqueous electrolytic solution secondary battery. Moreover, according to the process for producing the multilayer-structured carbon material for a nonaqueous electrolytic solution secondary battery negative electrode, it becomes possible to produce the negative electrode material having aforementioned advantages by simple and easy steps.

The invention claimed is:

1. A multilayer-structured carbon material for a nonaqueous electrolytic solution secondary battery negative electrode, which satisfies the following (a) and (b):
   (a) (Void fraction calculated from DBP oil absorption)/(Void fraction calculated from tapping density) is less than 1.01; and
   (b) Surface oxygen content (O/C) determined by X-ray photoelectron spectroscopy is 1.5 atomic % or more.

2. A multilayer-structured carbon material for a nonaqueous electrolytic solution secondary battery negative electrode, which comprises graphite particles and amorphous carbon that coats the surface of the graphite particles, and satisfies the following (a):
   (a) (Void fraction calculated from DBP oil absorption)/(Void fraction calculated from tapping density) is less than 1.01.

3. A multilayer-structured carbon material for a nonaqueous electrolytic solution secondary battery negative electrode, which comprises graphite particles and graphite carbon that coats the surface of the graphite particles, and satisfies the following (a) and (b):
   (a) (Void fraction calculated from DBP oil absorption)/(Void fraction calculated from tapping density) is less than 1.01; and
   (b) Surface oxygen content (O/C) determined by X-ray photoelectron spectroscopy is 1.5 atomic % or more.

4. The multilayer-structured carbon material for a nonaqueous electrolytic solution secondary battery negative electrode according to claim 1, wherein the DBP oil absorption is 75 ml/100 g or less and a Raman value R determined from Raman spectrometry is 0.15 or more.

5. The multilayer-structured carbon material for a nonaqueous electrolytic solution secondary battery negative electrode according to claim 1, wherein a ratio of the number of particles of 3 μm or less observed on a flow particle image analyzer is 5% or more.

6. A negative electrode for a nonaqueous electrolytic solution secondary battery, comprising a current collector and an active material layer formed on the current collector, wherein the active material layer contains the multilayer-structured carbon material for a nonaqueous electrolytic solution secondary battery negative electrode according to claim 1.

7. A lithium ion secondary battery, comprising: a positive electrode and a negative electrode capable of occluding and releasing lithium ion; and an electrolyte wherein the negative electrode is the negative electrode for a nonaqueous electrolytic solution secondary battery according to claim 6.

8. A process for producing a multilayer-structured carbon material for a nonaqueous electrolytic solution secondary battery negative electrode, which comprises subjecting a multilayer-structured carbon raw material to a cracking treatment, wherein, in the cracking treatment, power per weight of the multilayer-structured carbon raw material is 50 W/kg or more and 3,000 W/kg or less; and
   wherein the multilayer-structured carbon material satisfies the following (a) and (b);
   (a) (Void fraction calculated from DBP oil absorption)/(Void fraction calculated from tapping density) is less than 1.01; and
   (b) Surface oxygen content (O/C) determined by X-ray photoelectron spectroscopy is 1.5 atomic % or more.

9. The process for producing a multilayer-structured carbon material for a nonaqueous electrolytic solution secondary battery negative electrode according to claim 8, wherein the cracking treatment is performed under an oxygen atmosphere.

10. The process for producing a multilayer-structured carbon material for a nonaqueous electrolytic solution secondary battery negative electrode according to claim 8, wherein the cracking treatment is performed for a treatment time of 0.1 minutes to 120 minutes.

* * * * *